United States Patent
Chang

(10) Patent No.: US 10,696,394 B2
(45) Date of Patent: Jun. 30, 2020

(54) SHAPE-RECONFIGURABLE DRONE

(71) Applicant: KOREA AEROSPACE RESEARCH INSTITUTE, Daejeon (KR)

(72) Inventor: Sung Ho Chang, Sejong (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 218 days.

(21) Appl. No.: 15/740,733

(22) PCT Filed: Jul. 28, 2016

(86) PCT No.: PCT/KR2016/008254
§ 371 (c)(1),
(2) Date: Dec. 28, 2017

(87) PCT Pub. No.: WO2017/018813
PCT Pub. Date: Feb. 2, 2017

(65) Prior Publication Data
US 2018/0186450 A1 Jul. 5, 2018

(30) Foreign Application Priority Data

Jul. 30, 2015 (KR) .................. 10-2015-0107806
Aug. 5, 2015 (KR) .................. 10-2015-0110418

(51) Int. Cl.
*B64C 37/02* (2006.01)
*B64C 27/10* (2006.01)
*B64C 27/52* (2006.01)
*B64C 39/02* (2006.01)

(52) U.S. Cl.
CPC .............. *B64C 37/02* (2013.01); *B64C 27/10* (2013.01); *B64C 27/52* (2013.01); *B64C 39/024* (2013.01); *B64C 2201/027* (2013.01); *B64C 2201/108* (2013.01); *B64C 2201/127* (2013.01); *B64C 2201/128* (2013.01); *B64C 2201/165* (2013.01)

(58) Field of Classification Search
CPC ........................... B64C 37/02; B64C 2201/20
See application file for complete search history.

(56) References Cited

U.S. PATENT DOCUMENTS

| 8,453,962 B2 | 6/2013 | Shaw |
| 9,457,899 B2* | 10/2016 | Duffy ...................... B64C 37/02 |
| 10,358,214 B2* | 7/2019 | Zhang ..................... B64C 27/08 |
| 2007/0023581 A1 | 2/2007 | La |

(Continued)

FOREIGN PATENT DOCUMENTS

JP     3677748 B1     8/2005

OTHER PUBLICATIONS

ISA Korean Intellectual Property Office, International Search Report Issued in Application No. PCT/KR2016/008254, dated Oc. 31, 2016, 4 pages.

*Primary Examiner* — Philip J Bonzell
*Assistant Examiner* — Michael B. Kreiner
(74) *Attorney, Agent, or Firm* — McCoy Russell LLP

(57) ABSTRACT

A first embodiment relates to a shape-reconfigurable drone and, more specifically, to a shape-reconfigurable drone comprising unit module drones having a rectangular-parallelepiped body capable of applying a thrust in every direction, thereby being capable of flying horizontally without rotating the drone and of forming a drone assembly formed by the coupling of the unit module drones, and thus can fly solo or can fly in various shapes.

18 Claims, 20 Drawing Sheets

(56) References Cited

U.S. PATENT DOCUMENTS

| | | | |
|---|---|---|---|
| 2012/0061508 A1 | 3/2012 | de Viry et al. | |
| 2012/0158215 A1* | 6/2012 | Sun | B64C 27/20 |
| | | | 701/3 |
| 2014/0374532 A1 | 12/2014 | Duffy et al. | |
| 2017/0085840 A1* | 3/2017 | Mizushina | H04N 5/2257 |
| 2017/0313418 A1* | 11/2017 | Yoon | B64C 27/08 |
| 2018/0194463 A1* | 7/2018 | Hasinski | B64C 39/024 |

* cited by examiner

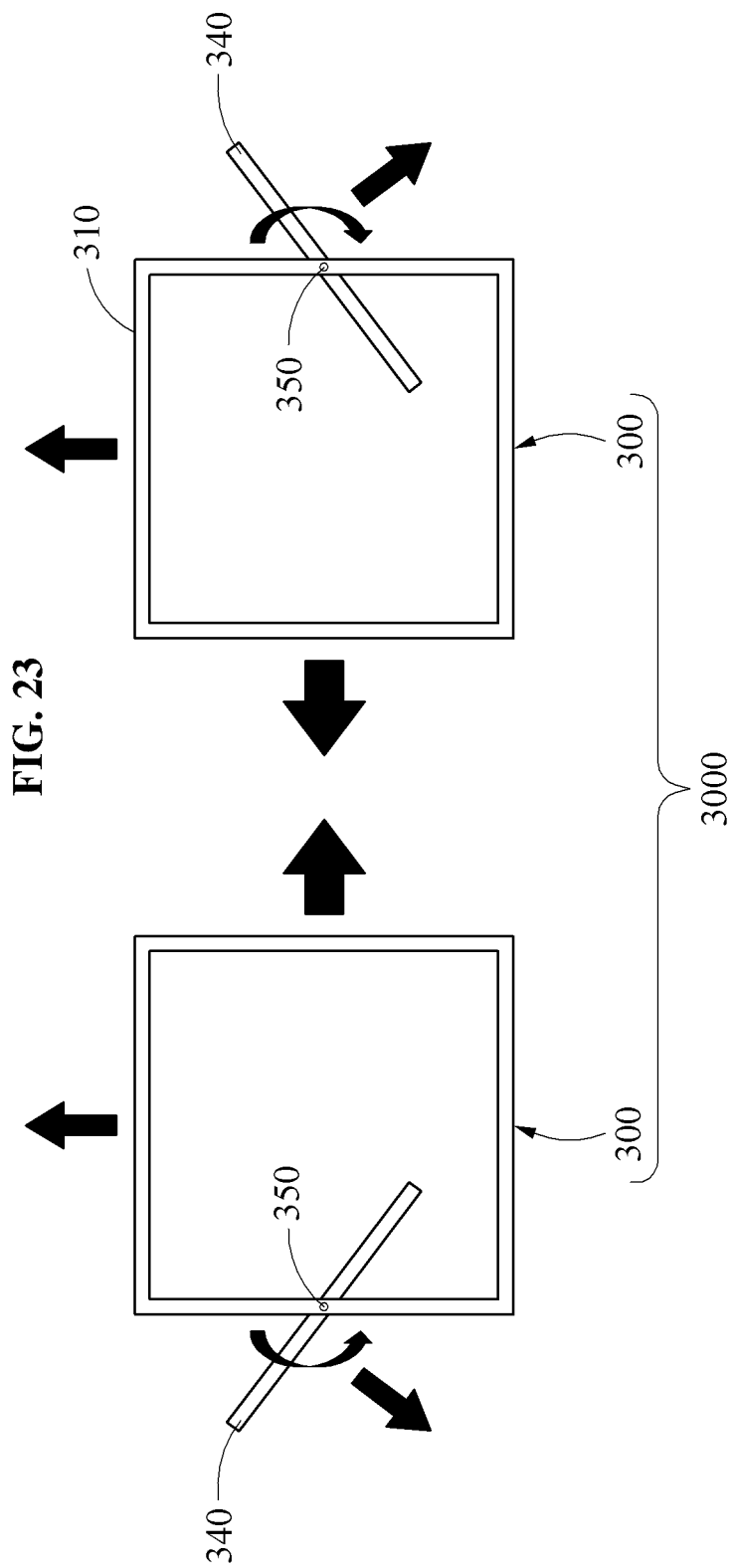

SHAPE-RECONFIGURABLE DRONE

CROSS-REFERENCE TO RELATED APPLICATIONS

The present application is a U.S. National Phase of International Patent Application Serial No. PCT/KR2016/008254 entitled "SHAPE-RECONFIGURABLE DRONE," filed on Jul. 28, 2016. International Patent Application Serial No. PCT/KR2016/008254 claims priority to Korean Patent Application No. 10-2015-0107806, filed on Jul. 30, 2015, and also claims priority to Korean Patent Application No. 10-2015-0110418 filed on Aug. 5, 2015. The entire contents of each of the above-cited applications are hereby incorporated by reference in their entirety for all purposes.

TECHNICAL FIELD

Example embodiments relate to a shape-reconfigurable drone, and more particularly, to a shape-reconfigurable drone that includes a unit module drone including a rectangular parallelepiped-shaped body configured to apply a thrust force in hexahedral directions, and flying horizontally without a rotational motion and also forming an assembly drone through a combination of such unit module drones, thereby flying independently or flying in various forms.

In addition, the shape-reconfigurable drone may include a unit module drone provided in a shape in which neighboring faces of one face among hexahedral faces are unfolded or folded based on the one face.

The flowing description relates to the shape-reconfigurable drone.

BACKGROUND ART

In general, a drone refers to an unmanned aerial vehicle that is provided in a shape of an aircraft or a helicopter and used for military purposes, and flies or steers through induction of radio waves without a human pilot or operator. A drone is currently used for commercial purposes, in addition to the military purposes. Thus, research has been actively conducted on drones to be used for such various purposes.

A drone having a desirable detection performance and a rapid mobility using a camera, a sensor, and the like is used in various fields such as, for example, transportation, security, surveillance, and observation.

For example, online shopping malls in America plan to establish a distribution and delivery system using a drone, and promote such a system.

A drone may be provided in various types, for example, a fixed-wing type drone, a rotary-wing type drone, and a hybrid type drone, to suit various purposes of use.

A fixed-wing type drone refers to a drone configured to fly using a lift force generated from a fixed wing, as in a general aircraft, which is disclosed in the US Patent Publication No. 2012-0061508 entitled "Device for Firing Weapons from an Armed Drone" (refer to FIG. 1) published in Mar. 15, 2012.

A rotary-wing type drone refers to a drone configured to fly using a force generated from a rotating wing as illustrated in FIGS. 2A and 2B, and a hybrid type drone refers to a tiltrotor-type unmanned aerial vehicle or drone using principles of both a fixed wing and a rotary wing.

However, when a drone or a general drone illustrated in FIGS. 1 and 2A and 2B changes a direction during a flight and increases a speed to move in a desired direction under control of a thruster or a propulsion device thereof, a portion of a body thereof may be tilted.

That is, the general drone may perform rolling, pitching, and yawing motions to tilt the body towards the desired direction or a destination. Here, when the general drone tilts the body, freight loaded in the body may also be tilted, and thus a risk of damage or loss may increase. In addition, controlling a flight of the general drone may not be possible due to a change in a center of gravity.

In addition, the general drone may need to be separately designed to have a propellant to fly in accordance with a weight of loads therein and a weight of freight loaded therein.

Thus, the general drone may be provided in various types and forms based on a purpose of use or a weight of loaded freight. However, it may not be effective in terms of use of a drone.

DISCLOSURE OF INVENTION

Technical Goals

An aspect provides a shape-reconfigurable drone that includes a unit module drone provided in a rectangular parallelepiped-shaped frame and including a thruster formed on each of hexahedral faces and configured to generate on a thrust force in each of hexahedral directions, and moving horizontally in the hexahedral directions without a rotational motion such as rolling, pitching, and yawing motions by a movement of the drone, thereby preventing a load or freight of the drone from being tilted to one side.

Another aspect also provides a shape-reconfigurable drone that includes a unit module drone including a thruster configured to generate a thrust force, and moving horizontally in hexahedral directions and flying independently, and that is also configured as an assembly drone that may move horizontally in hexahedral directions through a combination of a plurality of unit module drones.

Still another aspect also provides a drone that includes a unit module drone provided in a shape in which neighboring faces of one face among hexahedral faces are unfolded or folded based on the one face.

Yet another aspect also provides a drone that includes a thruster provided on each of a plurality of faces of the drone and configured to generate a greater thrust force in a same direction when side faces of the drone are unfolded based on an upper side face thereof to form a same plane with the upper side face, and thus may fly in a more stable posture and with a relatively heavier load.

Further another aspect also provides a drone that includes a unit module drone provided in a shape in which a thruster is tilted towards hexahedral faces, and may thus control a thrust direction at various angles to allow the thruster to have rotation surfaces with respect to a plurality of axes or shafts.

Further another aspect also provides a shape-reconfigurable drone that includes a thruster provided on each of hexahedral faces and configured to generate a thrust force at various angles, and may move horizontally in hexahedral directions without a rotational motion such as rolling, pitching, and yawing motions by a movement of the drone, thereby preventing a weight of a load or freight thereof from being shifted to one side.

Further another aspect also provides a drone that is configured to fly independently as a unit module drone, and also configured as an assembly drone through a combination of a plurality of unit module drones. In the assembly drone, a thruster provided on each of remaining faces, excluding combined or connected faces, may also be tilted with respect to hexahedral faces, as shown in the unit module drone.

Technical Solutions

According to a first example embodiment, there is provided a shape-reconfigurable drone that includes a unit module drone including a body including a frame and provided in a rectangular parallelepiped shape, a controller provided on one side in the body and configured to control a flight, a thruster connected to the controller and provided on each of hexahedral faces and configured to generate a thrust force in each of hexahedral directions, a power supplier provided on one side of the controller and configured to supply power to the thruster under control of the controller, and a connector provided on an outer face of the body to connect bodies of unit module drones. The shape-reconfigurable drone may also be configured as an assembly drone provided in a form in which the unit module drones are connected by the connector.

The unit module drone may include a direction axis setter configured to set a direction axis using a ground contact sensor provided on one side of the body.

The unit module drone may include a body direction setter configured to set a positional direction of the body using an inertia sensor provided on another side of the body.

The thruster may be provided as a propeller type thruster.

The thruster may be provided as a pair of coaxial propellers having opposite propeller pitches.

The thruster may also be provided as a contra-rotating propeller.

The thruster may include a thrust vector control device.

The unit module drone may further include a freight connector on one side of the frame to be connected to freight.

The unit module drone may further include a capturer including a camera in the body to capture an image.

The body may be provided in a form of a duct.

According to a second example embodiment, there is provided a shape-reconfigurable drone that includes a unit module drone including a body including a frame and provided in a hexahedral shape, a thruster provided on each of hexahedral faces of the body and configured to generate a thrust force in each of hexahedral directions, and a power supplier extended from the frame and fixed and configured to supply power to the thruster. In the unit module drone, neighboring faces of one face among the hexahedral faces may be unfolded or folded based on the one face.

The neighboring faces of the one face among the hexahedral faces may be unfolded to form a same plane with the one face.

The unit module drone may further include an actuator, a bevel gear, or a worm gear configured to allow the neighboring faces of the one face among the hexahedral faces to be unfolded or folded based on the one face.

The unit module drone may further include a connector provided on an outer face of the body and configured to connect bodies of unit module drones. Here, neighboring faces of one face among remaining faces, excluding connected faces of an assembly drone formed by connecting the bodies by the connector, may be unfolded or folded based on the one face.

According to a third example embodiment, there is provided a shape-reconfigurable drone that includes a unit module drone including a body including an outer frame and provided in a hexahedral shape, a thruster provided on each of hexahedral faces of the body and configured to generate a thrust force in each of hexahedral directions, and a power supplier connected to the thruster and configured to supply power to the thruster. The thruster may be tilted with respect to each of the hexahedral faces.

A drive shaft of the thruster may be tilted based on a center rotation point on each of the hexahedral faces to change a thrust direction.

The unit module drone may further include a first rotation frame provided on an inner side of the hexahedral faces of the outer frame and configured to rotate on a first rotation shaft with respect to the outer frame. Here, the thruster may be fixed to the first rotation frame.

The unit module drone may further include a second rotation frame provided on an inner side of the first rotation frame and configured to rotate on a second rotation shaft with respect to the first rotation frame. The second rotation shaft may be perpendicular to the first rotation shaft, and the thruster may be fixed to the second rotation frame.

The unit module drone may further include a bearing, a motor, an actuator, a bevel gear, or a worm gear to allow the first rotation frame and the second rotation frame to rotate.

The unit module drone may further include a connector provided on the outer frame and configured to connect a plurality of unit module drones, and a controller configured to control an angle at which the thruster is tilted with respect to each of the hexahedral faces.

According to a fourth example embodiment, there is provided a shape-reconfigurable drone that includes a unit module drone including a body including a polyhedral frame, a connector provided on the polyhedral frame and configured to connect bodies of unit module drones, and a thruster provided on each of faces of the body and configured to generate a thrust force in a direction in which the thruster is tilted with respect to each of the faces. The shape-reconfigurable drone may be configured as an assembly drone provided in a form in which the unit module drones are connected by the connector.

The unit module drone may further include a first rotation frame provided on an inner side of faces of the polyhedral frame and configured to rotate on a first rotation shaft with respect to the polyhedral frame. Here, the thruster may be fixed to the first rotation frame.

The unit module drone may further include a second rotation frame provided on an inner side of the first rotation frame and configured to rotate on a second rotation shaft with respect to the first rotation frame. The second rotation shaft may be perpendicular to the first rotation shaft, and the thruster may be fixed to the second rotation frame.

The unit module drone may further include a bearing, a motor, an actuator, a bevel gear, or a worm gear configured to allow the first rotation frame and the second rotation frame to rotate.

Advantageous Effects

According to example embodiments described herein, a shape-reconfigurable drone may include a body including a frame and provided in a rectangular parallelepiped shape, and a thruster formed on each of hexahedral faces and configured to generate a thrust force towards each of hexahedral directions, and thus may move horizontally in hexahedral directions without a rotational motion such as rolling, pitching, and yawing motions by a movement of the drone, thereby preventing a load or freight thereof from being tilted to one side.

According to example embodiments described herein, a shape-reconfigurable drone may move horizontally in hexahedral directions without a rotational motion such as rolling, pitching, and yawing motions by a movement of the drone, and thus prevent a situation in which controlling the drone is not possible due to the rotational motion.

According to example embodiments described herein, a shape-reconfigurable drone may move horizontally in hexahedral directions, and thus arrive at an accurate location of a desired destination.

According to example embodiments described herein, a shape-reconfigurable drone may move horizontally in hexahedral directions, of which a unit module drone configured independently may also move horizontally and independently, and also an assembly drone formed with a plurality of unit module drones may also move horizontally in hexahedral directions. Thus, the drone may be conveniently embodied in various shapes as desired by a user.

According to example embodiments described herein, a shape-reconfigurable drone may be embodied in various shapes as desired by an operator and configured to support a weight of freight to be loaded, and thus may have various shapes based on a size of the freight or a purpose of use.

According to example embodiments described herein, a shape-reconfigurable drone may be embodied as a single unit module drone or an assembly drone through a combination of a plurality of unit module drones and produced in large quantities, and thus may be economically effective in terms of manufacturing.

According to example embodiments described herein, a shape-reconfigurable drone may be embodied as a unit module drone provided in a shape in which neighboring faces of one face among hexahedral faces are unfolded or folded based on the one face, and thus a thruster provided on each of faces may generate a greater thrust force in a same direction when side faces are unfolded from an upper face to form a same plane with the upper face. Thus, a more stable posture control and a flight with a relatively heavier load or freight may be enabled.

According to example embodiments described herein, a shape-reconfigurable drone may include a thruster tilted towards each of hexahedral faces, and thus may control a thrust direction at various angles by allowing the thruster to have rotation surfaces with respect to a plurality of axes or shafts.

According to example embodiments described herein, a shape-reconfigurable drone that includes a thruster configured to generate a thrust force at various angles with respect to hexahedral faces, and may move horizontally in hexahedral directions without a rotational motion such as rolling, pitching, and yawing motions by a movement of the drone, thereby preventing a load or freight thereof from being tilted to one side.

According to example embodiments described herein, in a case of an independent flight of a unit module drone and also a case of a flight of an assembly drone formed with a plurality of unit module drones, a thruster provided on each of remaining faces, excluding combined or connected faces, may be tilted with respect to hexahedral faces, and thus the thruster may have rotation surfaces on a plurality of axes or shafts such that a thrust direction may be controlled at various angles.

BRIEF DESCRIPTION OF DRAWINGS

FIG. 23 is a diagram illustrating an example of an assembly drone of which a thruster generates a thrust force in a direction in which the thruster is tilted with respect to faces.

BEST MODE FOR CARRYING OUT THE INVENTION

Hereinafter, a shape-reconfigurable drone according to a first example embodiment and a second example embodiment will be described in detail with reference to the accompanying drawings.

The terms used herein are not to be interpreted based solely on the terms themselves, but to be interpreted based on the meanings of the terms as defined herein and the overall context of the present disclosure. In addition, the terms may need to be construed as corresponding to technical features or inventive concept described in the first example embodiment based on what an inventor(s) defines each of the terms.

It should be understood that there is no intent to limit the present disclosure to the particular example embodiments disclosed. The examples and illustrated configurations are provided merely as a desirable example of the first example embodiment, and not represent all the technical features or inventive concept of the first example embodiment. Thus, various changes, modifications, and equivalents of the methods, apparatuses, and/or systems described herein will be apparent after an understanding of the present disclosure.

Figure 1:
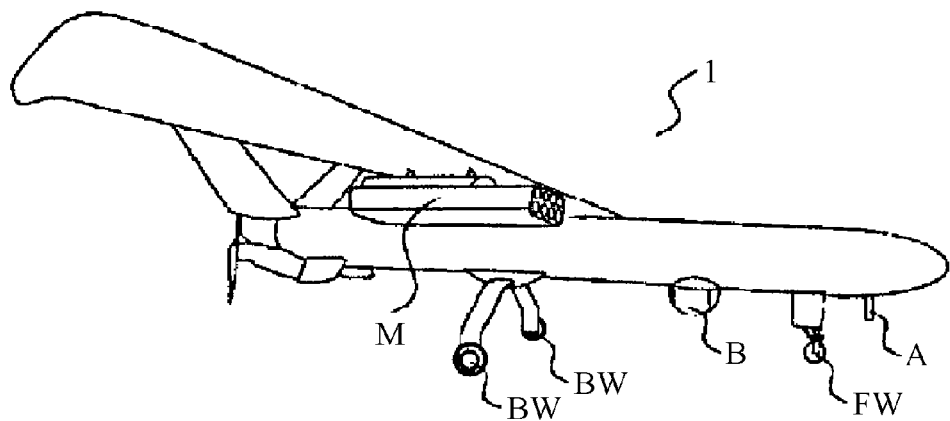
FIG. 1 is a diagram illustrating an example of a general-type drone.
Figure 2A:
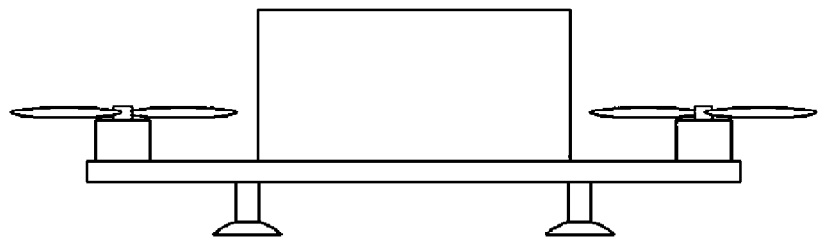
FIGS. 2A and 2B are diagrams illustrating an example of a rotational motion of a general-type drone.
Figure 2B:
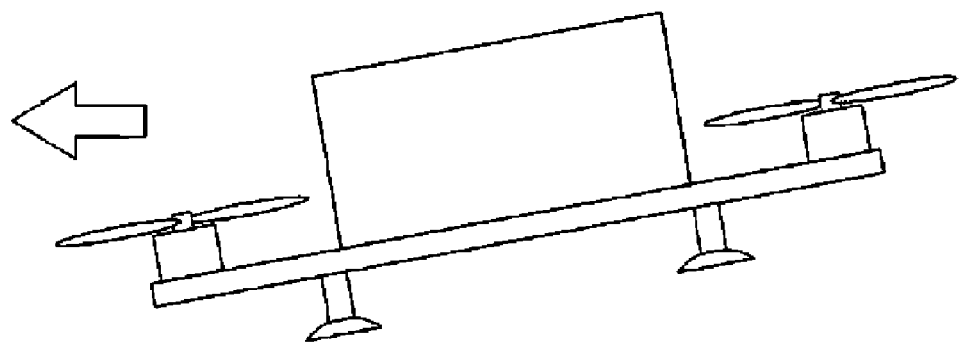
Figure 3:
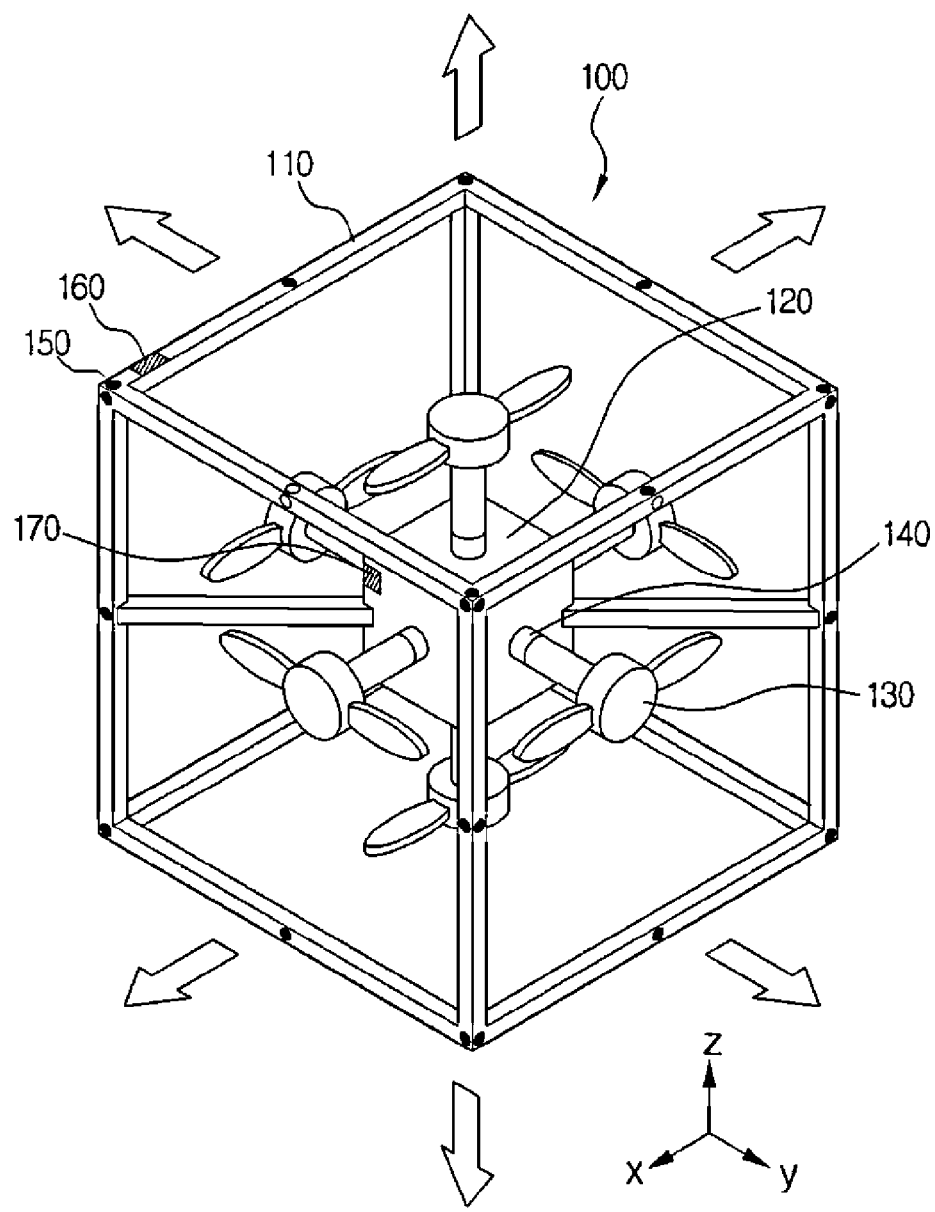
FIG. 3 is a perspective view illustrating an example of a unit module drone of a shape-reconfigurable drone according to a first example embodiment.
Figure 4:
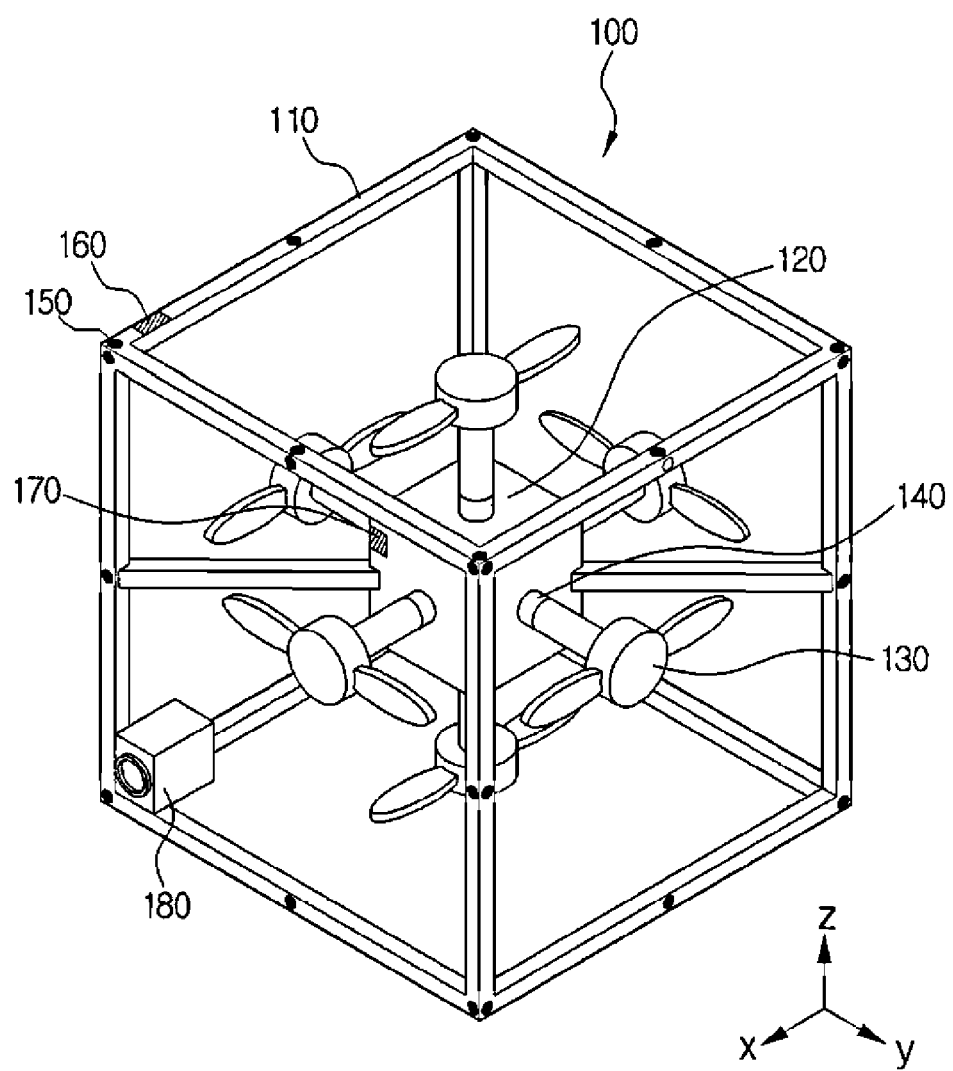
FIG. 4 is a perspective view illustrating another example of a unit module drone of a shape-reconfigurable drone according to the first example embodiment.
Figure 5:
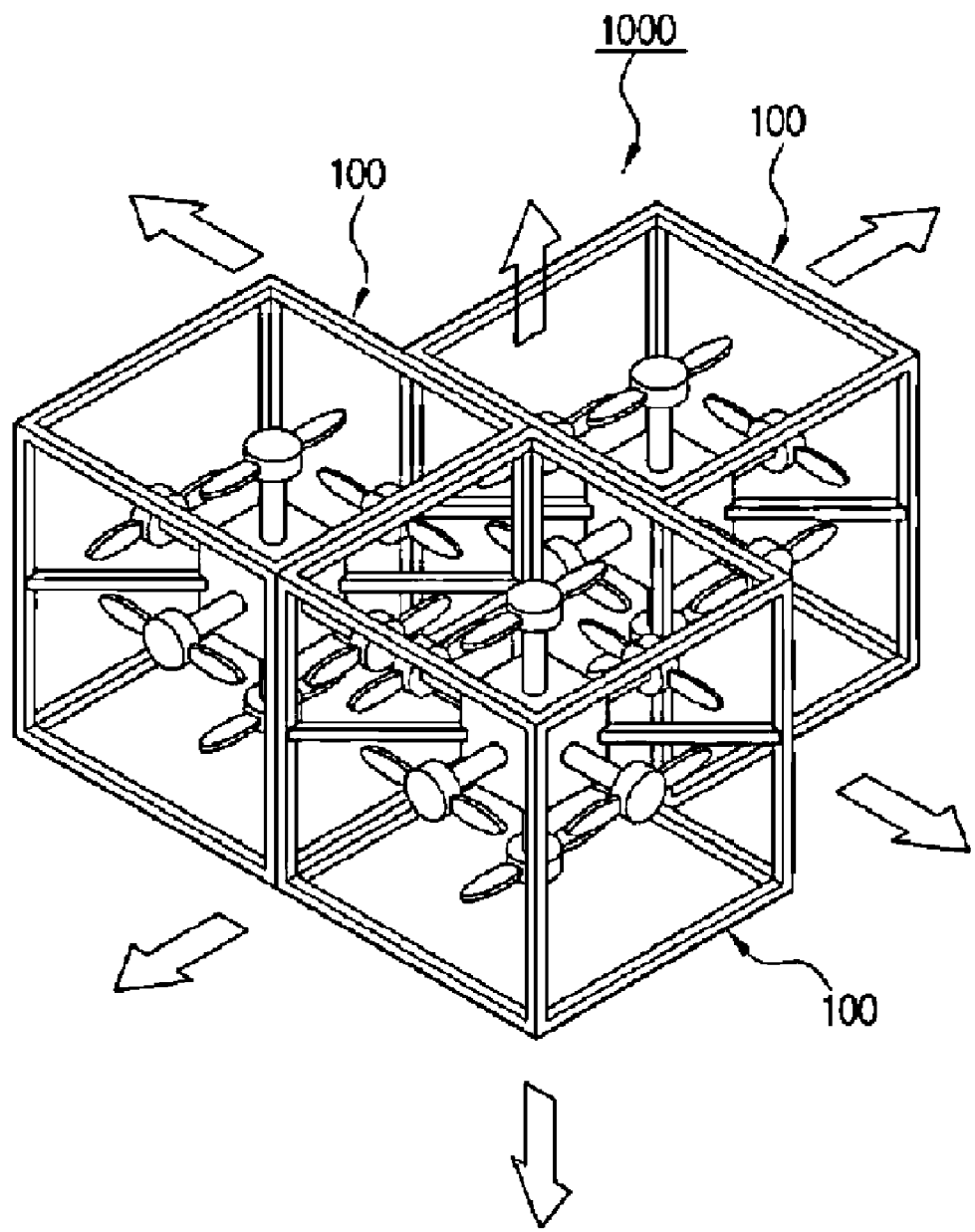
FIG. 5 is a perspective view illustrating an example of an assembly drone of a shape-reconfigurable drone according to the first example embodiment.
Figure 6:
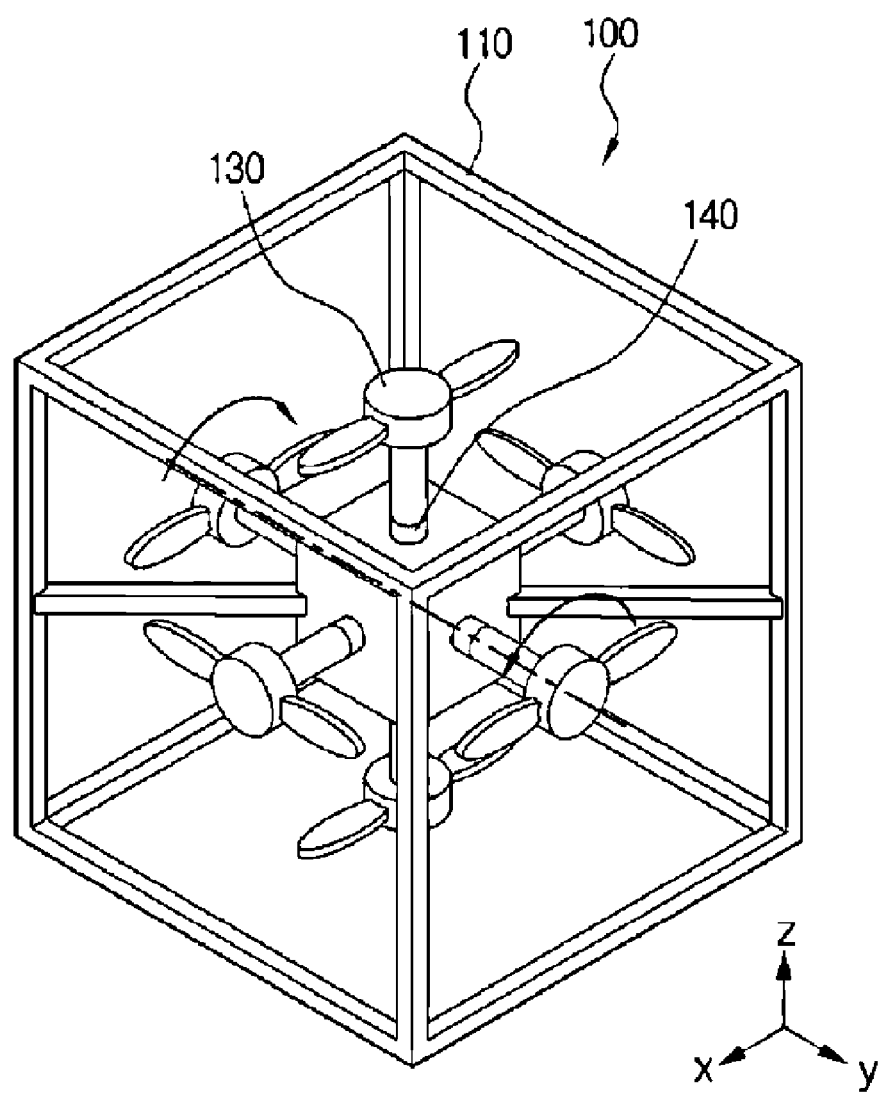
FIG. 6 is a perspective view illustrating an example of a thruster of a shape-reconfigurable drone according to the first example embodiment.
Figure 7:
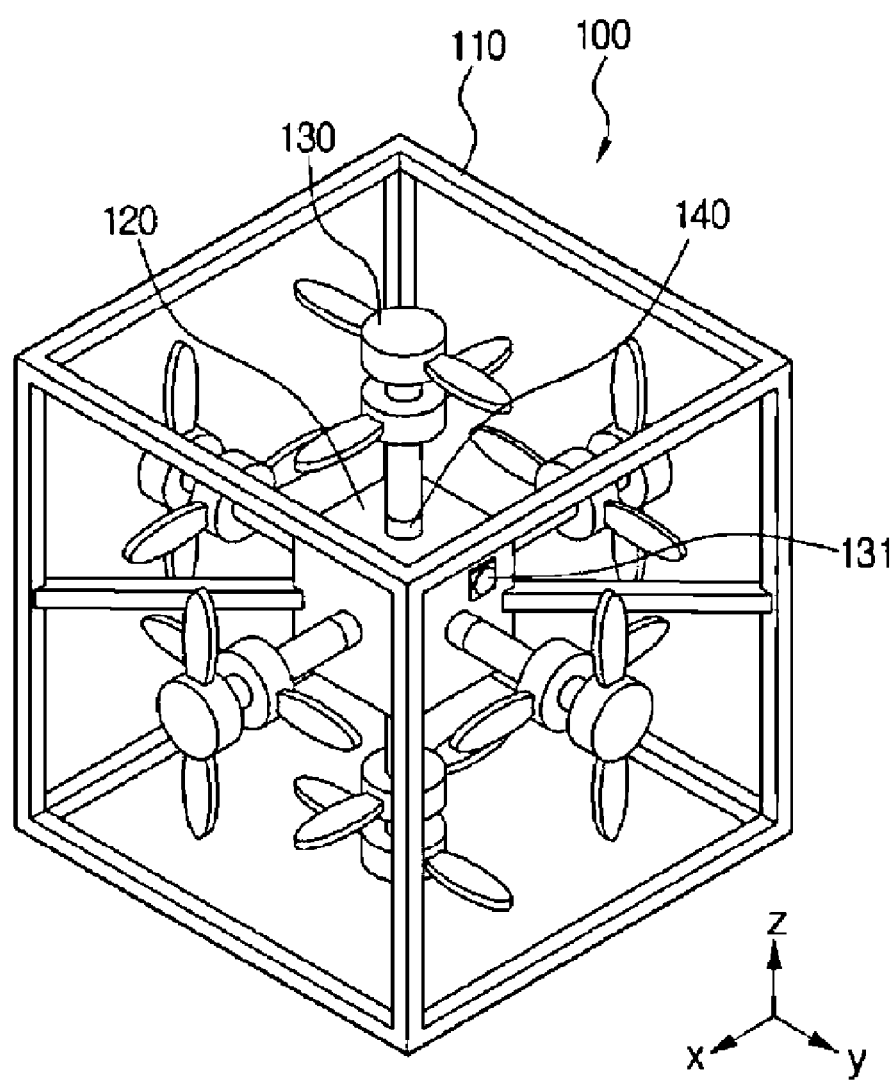
FIG. 7 is a perspective view illustrating another example of a thruster of a shape-reconfigurable drone according to the first example embodiment.
Figure 8:
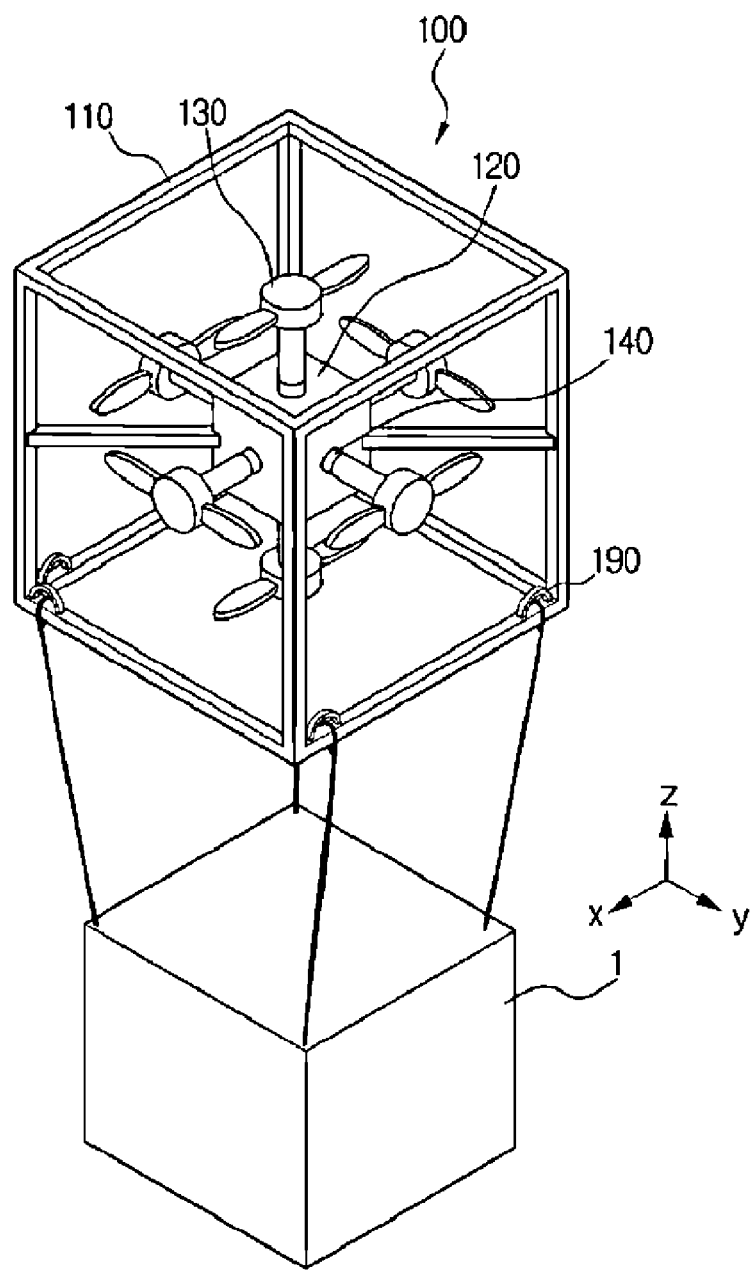
FIG. 8 is a perspective view illustrating an example of a freight connector of a unit module drone of a shape-reconfigurable drone according to the first example embodiment.
Figure 9:
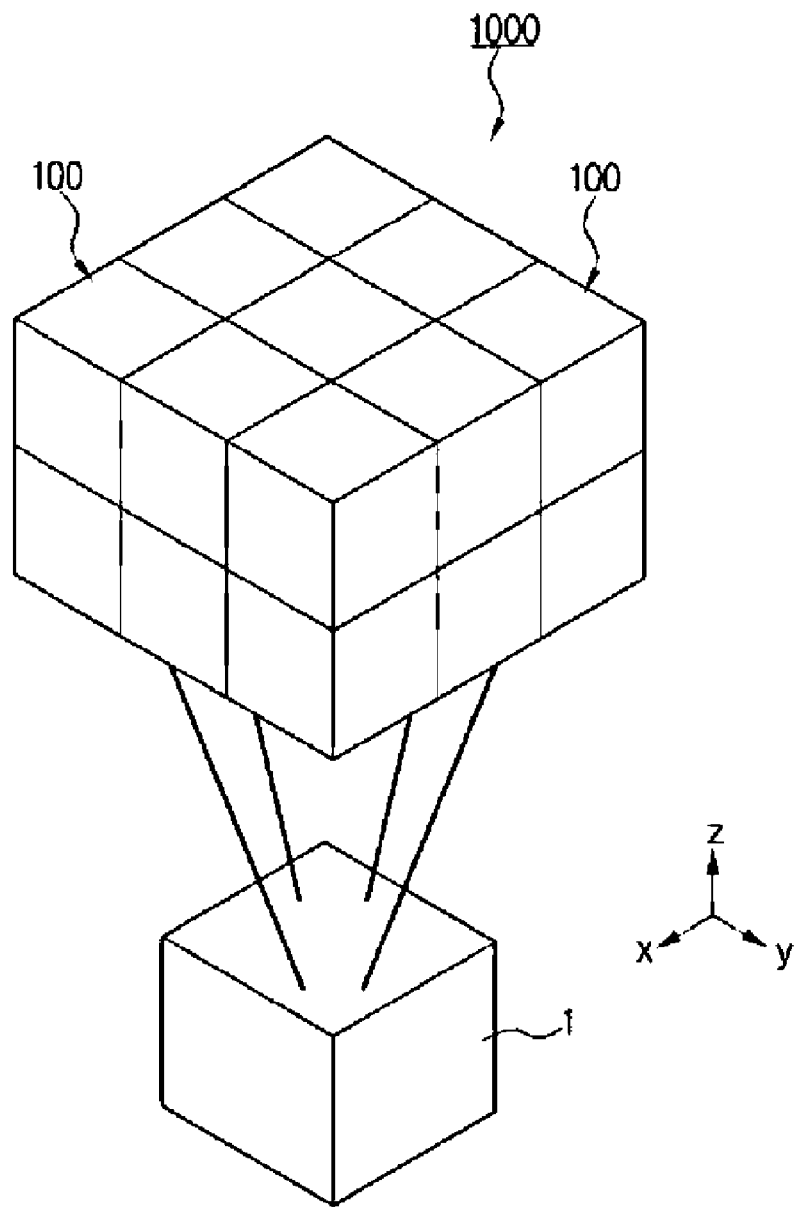
FIG. 9 is a perspective view illustrating another example of an assembly drone of a shape-reconfigurable drone according to the first example embodiment.
Figure 10:
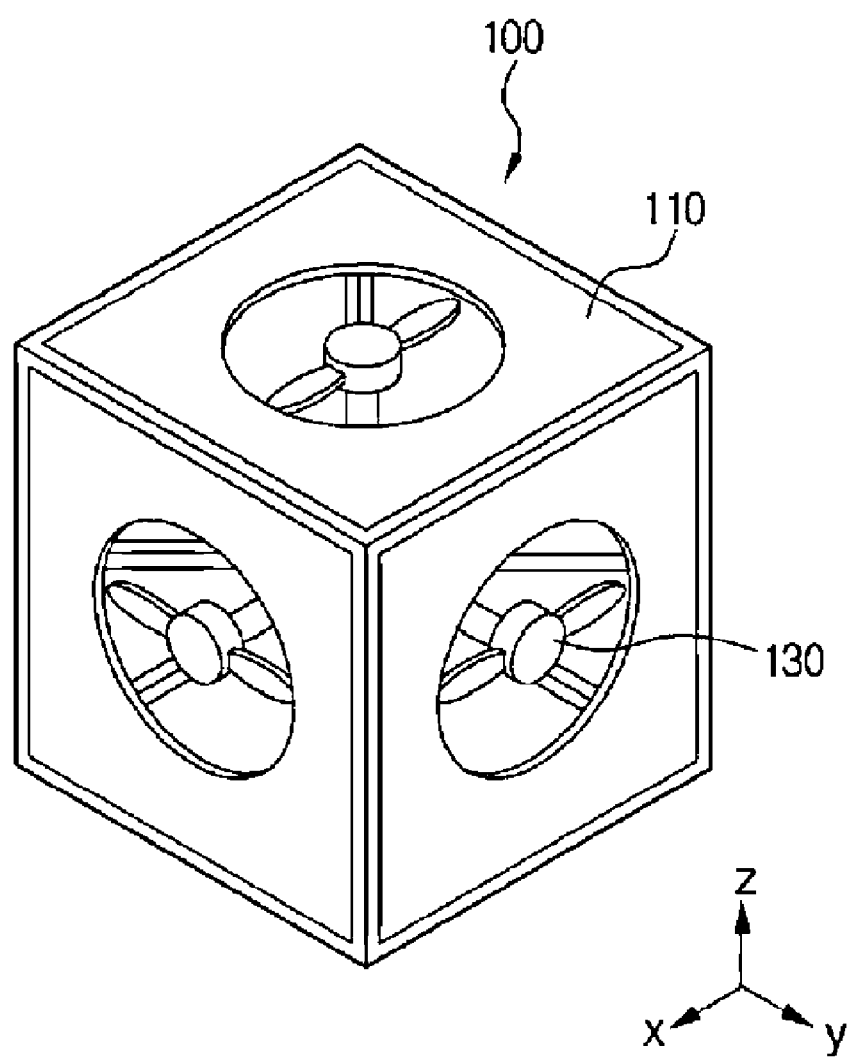
FIG. 10 is a perspective view illustrating an example of a shape-reconfigurable drone according to the first example embodiment.

FIG. 1 is a diagram illustrating an example of a general-type drone. FIGS. 2A and 2B are diagrams illustrating an example of a rotational motion of the general-type drone. FIG. 3 is a perspective view illustrating an example of a unit module drone of a shape-reconfigurable drone according to a first example embodiment. FIG. 4 is a perspective view illustrating another example of a unit module drone of a shape-reconfigurable drone according to the first example embodiment. FIG. 5 is a perspective view illustrating an example of an assembly drone of a shape-reconfigurable drone according to the first example embodiment. FIG. 6 is a perspective view illustrating an example of a thruster of a shape-reconfigurable drone according to the first example embodiment. FIG. 7 is a perspective view illustrating another example of a thruster of a shape-reconfigurable drone according to the first example embodiment. FIG. 8 is a perspective view illustrating an example of a freight connector of a unit module drone of a shape-reconfigurable drone according to the first example embodiment. FIG. 9 is a perspective view illustrating another example of an assembly drone of a shape-reconfigurable drone according to the first example embodiment. FIG. 10 is a perspective view illustrating an example of a shape-reconfigurable drone according to the first example embodiment.

Referring to FIGS. 3 through 5, a shape-reconfigurable drone according to a first example embodiment is embodied or configured as a unit module drone 100 that is capable of flying independently, and an assembly drone 1000 that is formed by combining a plurality of unit module drones 100.

As illustrated in FIGS. 3 and 4, the unit module drone 100 includes components or members needed to enable such an independent flight. Alternatively, as illustrated in FIG. 5, in a case in which a single unit module drone 100 is not sufficient for the shape-reconfigurable drone, hereinafter also referred to as the drone, to perform a function for a certain purpose or the drone needs to be used for other purposes, the assembly drone 1000 may also be provided by combining a plurality of unit module drones 100 to be in a desired form or shape, and thus the drone may be used in various forms based on a purpose of use and a place where it is to be used.

The unit module drone 100 includes a body 110, a controller 120, a thruster 130, and a power supplier 140. The body 110 is provided in a rectangular parallelepiped shape including a frame.

Although it is recommended that the unit module drone 100 is provided in a shape of a regular hexahedron or a cube to form the assembly drone 1000 in combination, the shape is not limited to the example regular hexahedron.

The controller 120 is configured as a control device such as a computer, and provided on one side in the body 110.

The controller 120 controls a flight of the drone or a related algorithm. Although it is recommended that the controller 120 is provided at a center of the body 110, it may also be possible to provide the controller 120 on a side face in the frame.

The thruster 130 is connected to the controller 120, and provided on each of hexahedral faces.

It is recommended that the thruster 130 is provided as six thrusters in six directions, for example, up, down, left, right, back, and forth. The thruster 130 may thus generate a thrust force in each of hexahedral directions, or the six directions, such that the unit module drone 100 performs its operations, for example, a flight, a takeoff, and a landing.

That is, dissimilar to an existing general-type drone including a thrust device configured to generate a thrust force in one direction or both directions, the unit module drone 100 of the shape-reconfigurable drone according to the first example embodiment includes the thruster 130 configured to generate a thrust force in all the six directions or the hexahedral directions, and thus moves horizontally in all the hexahedral directions, and hence a load or freight loaded in the unit module drone 100 may not be tilted to one side in a direction in which the unit module drone 100 travels, or a center of gravity may not be shifted to one side.

In addition, a horizontal movement is enabled in all the hexahedral directions, and thus the drone may move to a more accurate location of a desired destination and a point at which it is to be taken off or landed, compared to the existing general-type drone.

In other words, dissimilar to the existing general-type drone, the drone may not need a rotational motion, for example, rolling, pitching, and yawing motions, for the body 110 to move in a desired direction, but move horizontally. The horizontal movement may enable easier control and safer movements, and thus the drone may transport food or dangerous chemical explosives more safely than the existing general-type drone.

Although it is also recommended that the thruster 130 is provided in a propeller type using a thrust force generated by a rotation of a propeller, which is widely used type, the thruster 130 is not limited to the propeller type, and may also be provided in various types, for example, a jet engine type.

The power supplier 140 is provided on one side of the controller 120 and disposed between the controller 120 and the thruster 130, and supplies power to the thruster 130 under control of the controller 120.

In addition, a connector 150 is used to form the assembly drone 1000 by connecting or combining a plurality of unit module drones 100 to be in a desired form. It is recommended that the connector 150 is disposed on an outer face of the body 110, or an outer face of the frame, for a tight combination or connection of the unit module drones 100.

The assembly drone 1000 is provided by various methods of connection or combination of the unit module drones 100, for example, by attaching them using a magnet and combining them using a bolt. For example, when the unit module drones 100 are attached by a magnet, the connector 150 may be provided in a form of a magnet. For another example, when the unit module drones 100 are combined by a bolt, the connector 150 may be provided in a form of a hollow portion for a bolt and nut coupling or in a form of a pre-provided bolt. A form or a type of the connector 150 used to combine or connect the unit module drones 100 is not limited to the example forms or types described in the foregoing, and various other examples may also be provided.

Similar to a general aerial vehicle, there is not a defined direction, for example, a forward/backward direction and a left/right direction, for the unit module drone 100. Instead, the unit module drone 100 may move in the hexahedral directions, and thus a reference of a direction axis and a positional direction of the unit module drone 100 may need to be set for a more accurate and safer flight. Therefore, the unit module drone 100 according to the first example embodiment includes a direction axis setter 160 and a body direction setter 170.

The direction axis setter 160 uses a ground contact sensor provided on one side of the body 110, and the ground contact sensor is provided as a single ground contact sensor or a plurality of ground contact sensors on the body 110.

That is, a direction axis, for example, a x-y-z axis, may be set through the ground contact sensor being in contact with the ground, and the unit module drone 100 or the assembly drone 1000 may fly based on the set direction axis under control of the controller 120.

As described above, the unit module drone 100 of the shape-reconfigurable drone according to the first example embodiment may newly set a direction axis based on a portion being in contact with the ground, not by setting a direction axis in advance, dissimilar to an existing aerial vehicle that sets in advance a direction axis, because there is no reference by a movement and the unit module drone 100 moves horizontally in any of the hexahedral directions. Thus, an operator or the controller 120 may more readily control a flight of the drone.

The body direction setter 170 sets a positional direction of the body 110 using an inertia sensor provided on another side of the body 110.

That is, there is not a defined direction, for example, a forward/backward direction, an upward/downward direction, and a left/right direction, for the unit module drone 100, and thus the positional direction of the unit module drone 100 may be set using information obtained from the inertia sensor and direction axis information obtained by the direction axis setter 160 under control of the controller 120.

Thus, which of the hexahedral directions corresponds to an upward/downward direction, a forward/backward direction, or a left/right direction may be calculated or determined, and thus the body direction setter 170, along with the direction axis setter 160, may allow an operator or the controller 120 to more readily control a flight of the drone.

In addition, the inertia sensor of the body direction setter 170 may be a triaxial (x-y-z axis) complex sensor in which three axes are combined. Thus, the inertia sensor may be used by separating a first axis sensor and inserting it into the hexahedral frame, and thus a position of the inertia sensor is not limited to a certain position.

The unit module drone 100 of the shape-reconfigurable drone according to the first example embodiment further includes a capturer 180 including a camera provided on another side of the body 110 to capture an image.

The capturer 180 may allow the controller 120 to more readily control the drone, and capture an image to obtain map information and observation information.

Thus, the capturer 180 may help the drone perform surveillance and reconnaissance missions for military purposes, and may be provided on one or all the hexahedral faces of the body 110 based on a purpose of use. Thus, the number of capturers 180 is not limited.

As illustrated in FIGS. 5 and 6, a propeller type thruster that generates a thrust force by a rotation of a propeller is recommended for the shape-reconfigurable drone according to the first example embodiment.

However, the propeller type thruster may generate a torque corresponding to the rotation of the propeller. When the torque is generated, the body 110 may rotate in a direction opposite to a rotation direction of the propeller due to a principle of action and reaction, and thus the torque may need to be canceled or offset to increase straightness of the drone.

To offset the torque, an anti-torque control may be needed, and the thruster 130 of the shape-reconfigurable drone according to the first example embodiment may be provided as the following three examples.

<Example 1 of the Thruster 130>

As illustrated in FIG. 6, the thruster 130 is provided as a pair of coaxial thrusters 130, and a torque may be offset by rotating the thrusters 130 in opposite directions.

That is, by allowing the coaxial thrusters 130 to have opposite propeller pitches, a thrust direction and a thrust quantity may be controlled. Here, a variable pitch propeller may be used, but the thruster 130 is not limited to the variable pitch propeller.

<Example 2 of the Thruster 130>

As illustrated in FIG. 7, the thruster 130 is provided as a contra-rotating propeller.

The contra-rotating propeller refers to two propellers that are provided on an inner side and an outer side for a reverse rotation, and aligned side by side at respective shaft ends up and down.

When the inner side propeller and the outer side propeller rotate in opposite directions, a torque may be offset, and thus straightness and mobility may be improved.

<Example 3 of the Thruster 130>

As illustrated in FIG. 7, the thruster 130 includes a thrust vector control device 131.

The thrust vector control device 131 may use a thrust vane and the like. Here, to change a thrust direction and generate a pitching moment, a method of changing a nozzle shock wave and controlling a thrust force, a method of controlling a thrust force by a rotary nozzle, and a method of disposing a cletlector on a nozzle and controlling a thrust direction may be used.

As illustrated in FIG. 8, the unit module drone 100 of the shape-reconfigurable drone according to the first example embodiment further includes a freight connector 190 provided on one side of the frame to be connected to freight.

The freight connector 190 may be provided in various types, for example, a latch and a lifter. However, a type of the freight connector 190 is not limited to the example types described in the foregoing, and any types that may fix freight and transport the freight may be used for the freight connector 190.

FIG. 9 illustrates an example of how the assembly drone 1000 formed with a plurality of unit module drones 100 transports freight connected to the freight connector 190.

For example, in a case in which the unit module drone 100 of the shape-reconfigurable drone according to the first example embodiment has a thrust force that may transport a weight of 1 kilogram (kg), the assembly drone 1000 that is formed with n unit module drones 100 as illustrated in FIG. 9 may transport a weight of 1 kg×n. Thus, the unit module drones 100 may be combined or connected to form the assembly drone 1000 in various ways based on a weight of freight to be transported.

As illustrated in FIG. 10, the body 110 of the unit module drone 100 according to the first example embodiment may also be provided in a form of a duct, in addition to the frame.

A duct used herein refers to an air passage formed in a rectangular or circular shape with a metal plate to move a fluid. By the metal plate, elements or components may be inserted or provided in the body 110 in the duct, and an aeromechanical or aerodynamical effect may thus be improved.

Figure 11:
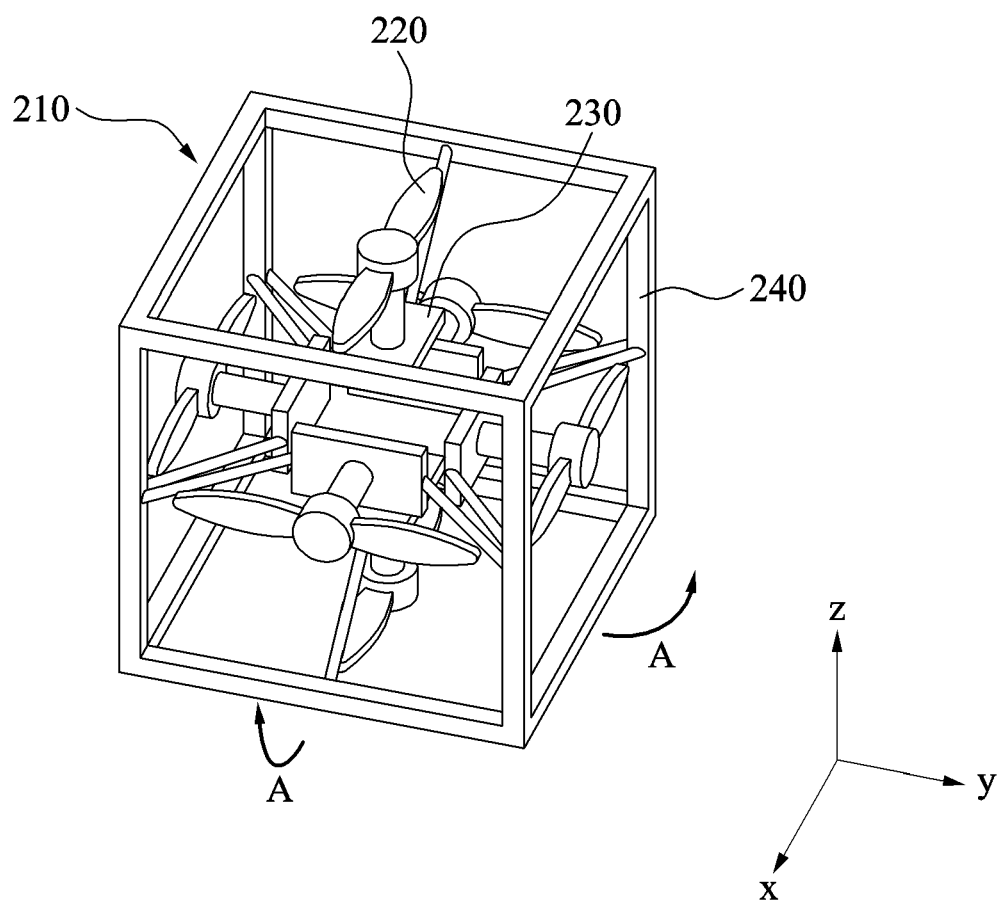
FIG. 11 is a perspective view of an example of a unit module drone of a shape-reconfigurable drone of which neighboring faces of one face is unfolded or folded based on the one face according to a second example embodiment.
Figure 12:
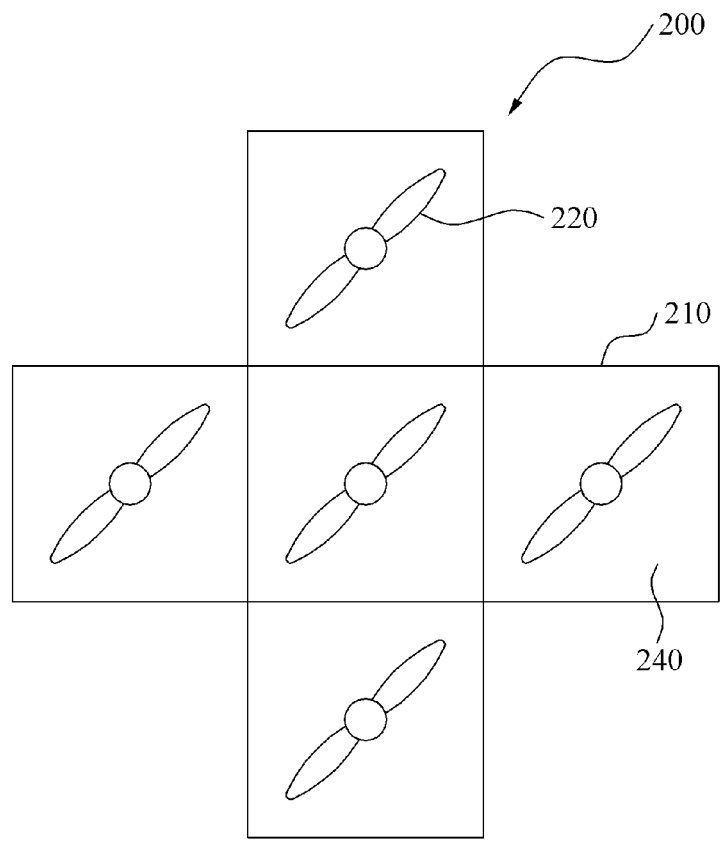
FIG. 12 is a diagram illustrating an example of a state in which neighboring faces of one face of a shape-reconfigurable drone are unfolded based on the one face according to the second example embodiment.
Figure 13:
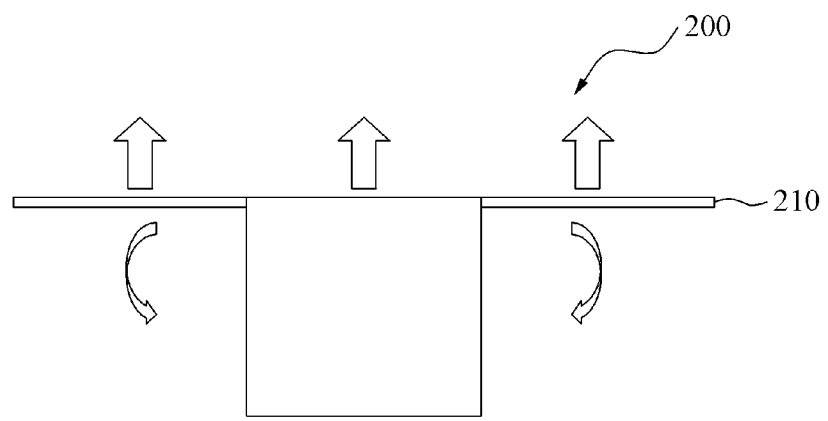
FIG. 13 is a diagram illustrating an example of a state in which neighboring faces of one face of a shape-reconfigurable drone form a same plane with the one face according to the second example embodiment.
Figure 14:
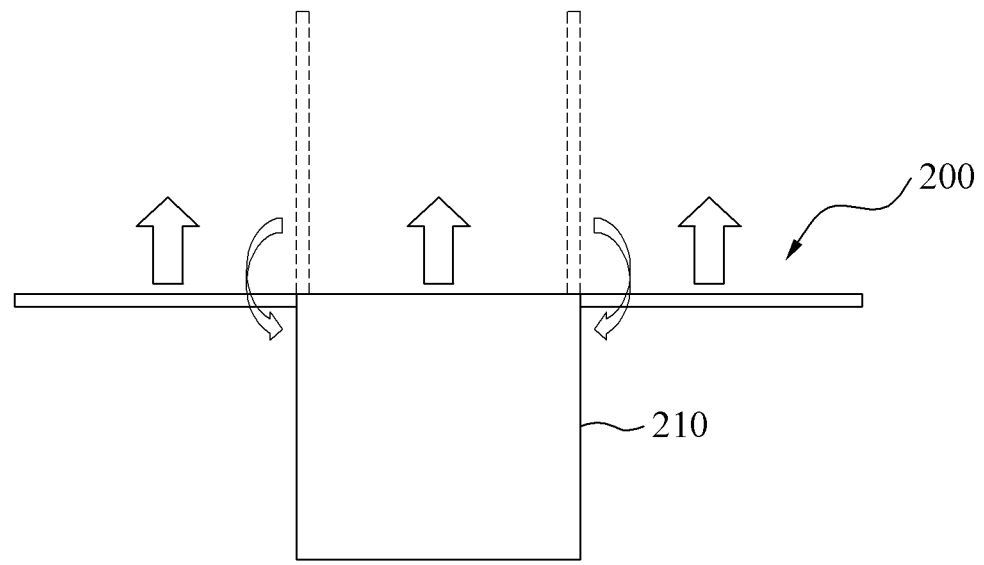
FIG. 14 is a diagram illustrating an example of a range in which neighboring faces of one face of a shape-reconfigurable drone are unfolded or folded based on the one face according to the second example embodiment.
Figure 15:
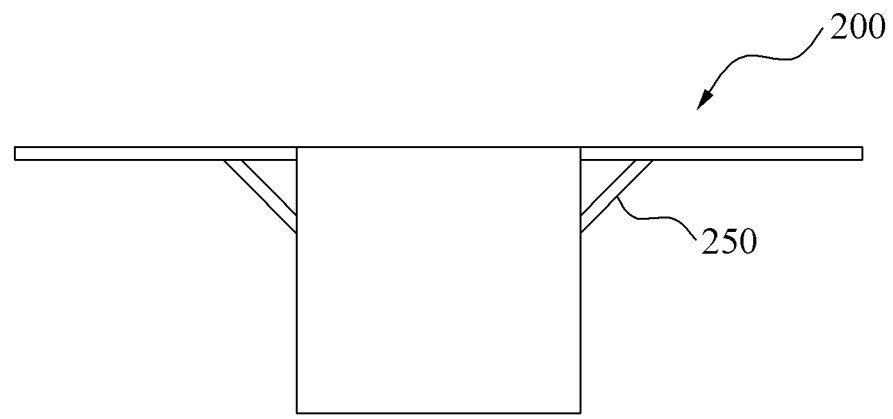
FIG. 15 is a diagram illustrating an example of how a side face of a shape-reconfigurable drone is folded according to the second example embodiment.
Figure 16:
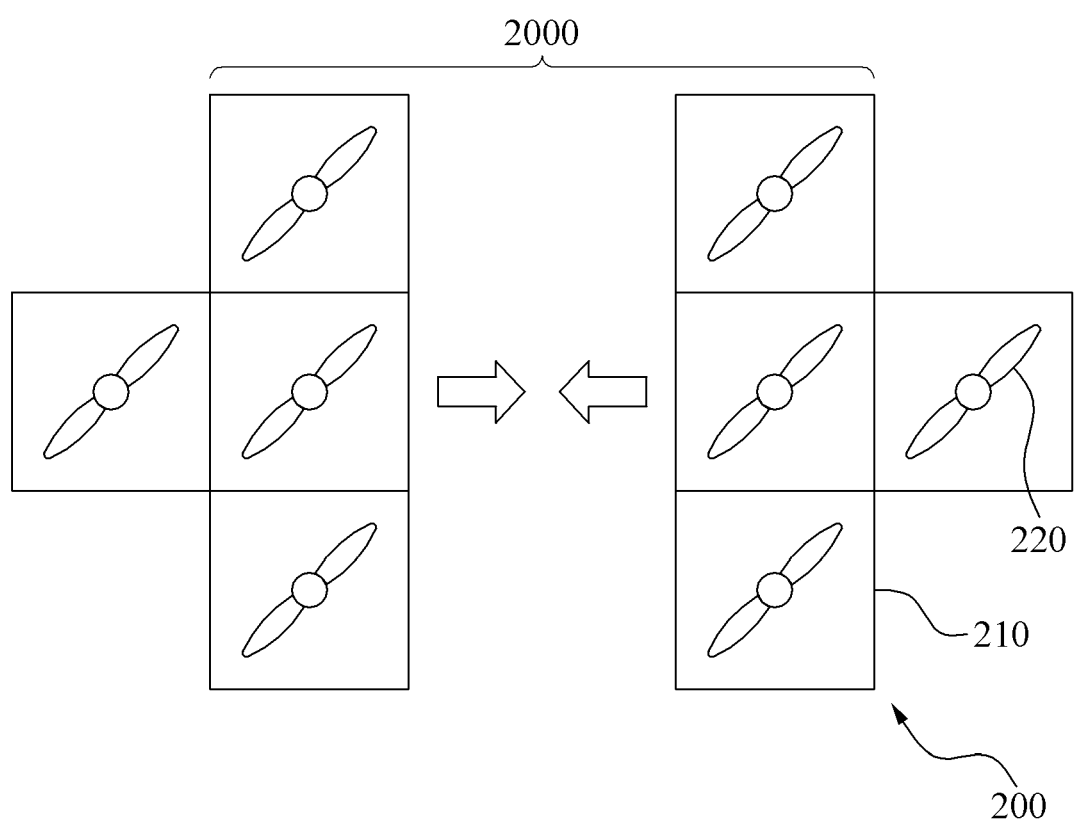
FIG. 16 is a diagram illustrating an example of how neighboring faces of one face of an assembly drone of a shape-reconfigurable drone are unfolded or folded based on the one face according to the second example embodiment.
Figure 17:
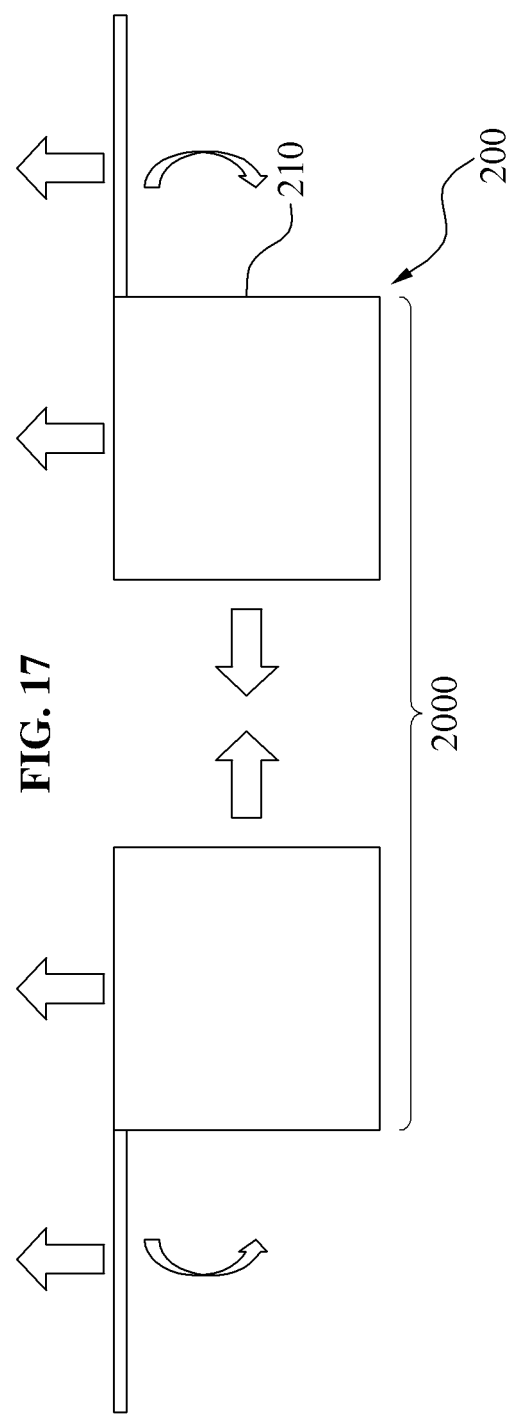
FIG. 17 is a diagram illustrating another example of how neighboring faces of one face of an assembly drone of a shape-reconfigurable drone are unfolded or folded based on the one face according to the second example embodiment.

FIG. 11 is a perspective view of an example of a unit module drone of which neighboring faces of one face of a shape-reconfigurable drone are unfolded or folded based on the one face according to a second example embodiment. FIG. 12 is a diagram illustrating an example of a state in which neighboring faces of one face of a shape-reconfigurable drone are unfolded based on the one face according to the second example embodiment. FIG. 13 is a diagram illustrating an example of a state in which neighboring faces of one face of a shape-reconfigurable drone form a same plane with the one face according to the second example embodiment. FIG. 14 is a diagram illustrating an example of a range in which neighboring faces of one face of a shape-reconfigurable drone are unfolded or folded based on the one face according to the second example embodiment. FIG. 15 is a diagram illustrating an example of how a side face of a shape-reconfigurable drone is folded according to the second example embodiment. FIG. 16 is a diagram illustrating an example of how neighboring faces of one face of an assembly drone of a shape-reconfigurable drone are unfolded or folded based on the one face according to the second example embodiment. FIG. 17 is a diagram illustrating another example of how neighboring faces of one face of an assembly drone of a shape-reconfigurable drone are unfolded or folded based on the one face according to the second example embodiment.

Referring to FIGS. 11 through 13, a shape-reconfigurable drone according to a second example embodiment includes a unit module drone 200 including a body 210 provided in a hexahedral shape including a frame, a thruster 220 provided on each of hexahedral faces 240 and configured to generate a thrust force in each of hexahedral directions or six directions, and a power supplier 230 extended from the frame and fixed and configured to supply power to the thruster 220. The shape-reconfigurable drone may be configured as the unit module drone 200 of which neighboring faces of one face among the hexahedral faces 240 are unfolded or folded based on the one face.

For convenience of description, descriptions of the same or similar elements or components as in the first example embodiment are omitted hereinafter. An element or component of the shape-reconfigurable drone according to the second example embodiment that is different from that of the shape-reconfigurable drone according to the first example embodiment will be described hereinafter.

The neighboring faces of the one face among the hexahedral faces 240 may be unfolded based on the one face in a direction indicated by an arrow A as illustrated in FIG. 11. That is, it is possible to unfold or fold the neighboring faces of the one face based on a frame forming the one face as an axis or a shaft.

Here, when the neighboring faces of the one face among the hexahedral faces 240 are unfolded in a range of 90 degrees (°) to form a same plane with the one face, five faces of the hexahedral faces 240 may form a same plane when the unit module drone 200 flies.

Thus, thrusters 220 provided on the five faces may generate a combined thrust force in a same direction, which is five times a thrust force of each. In addition, a flight control algorithm used for an existing quadcopter may be used, and also a high-speed flight may be enabled.

However, examples are not limited to the illustrative example, and a remaining face in addition to the five faces may also be unfolded based on the one face and all the six faces may form a same plane. In addition, an unnecessary face of the hexahedral faces 240 may be folded again during a flight, and thus energy may be saved.

Referring to FIG. 14, a side face may be unfolded and folded without a restriction on an angle. A side face may be fixed at a desired angle by a side face folder 250, and thus be maintained in an unfolded or folded state. As described above, neighboring faces of one face among the hexahedral faces 240 may be unfolded to form a same plane with the one face, and also unfolded or folded to form an oblique angle or a right angle with the one face used as a reference face, as necessary.

Referring to FIG. 15, the drone includes the side face folder 250 configured to unfold or fold the neighboring faces of the one face among the hexahedral faces 240 based on the one face. Here, an actuator, a bevel gear, or a worm gear may be used for the side face folder 250. However, examples are not limited to the examples described in the foregoing, and any elements or methods that may unfold side faces, as shown in wings, may also be used.

Referring to FIGS. 16 and 17, the drone further includes a connector (not shown) provided on an outer side face of the body 210 to connect bodies 210 of unit module drones 200, and the connector may combine or connect the bodies 210 to form an assembly drone 2000.

Here, neighboring faces of one face among remaining faces excluding connected faces of the assembly drone 2000 may be unfolded or folded based on the one face. Here, faces of the unit module drones 200 to be combined or connected to form the assembly drone 2000 may be folded such that the unit module drones 200 are to be connected.

In a case of the assembly drone 2000 formed by combining or connecting two unit module drones 200, and side faces are unfolded to form a same plane based on upper faces, thrusters of eight faces may generate a combined thrust force, which is four times a thrust force, in a same direction. Thus, a more stable posture control may be enabled, and a flight with a relatively greater weight of load or freight may also be enabled.

However, examples are not limited to the example described in the foregoing, and a greater number of unit module drones 200 may be connected, as necessary. In addition, a greater number of faces may be unfolded to form a same plane, and thus a greater combined thrust force may be generated in a same direction.

Figure 18:
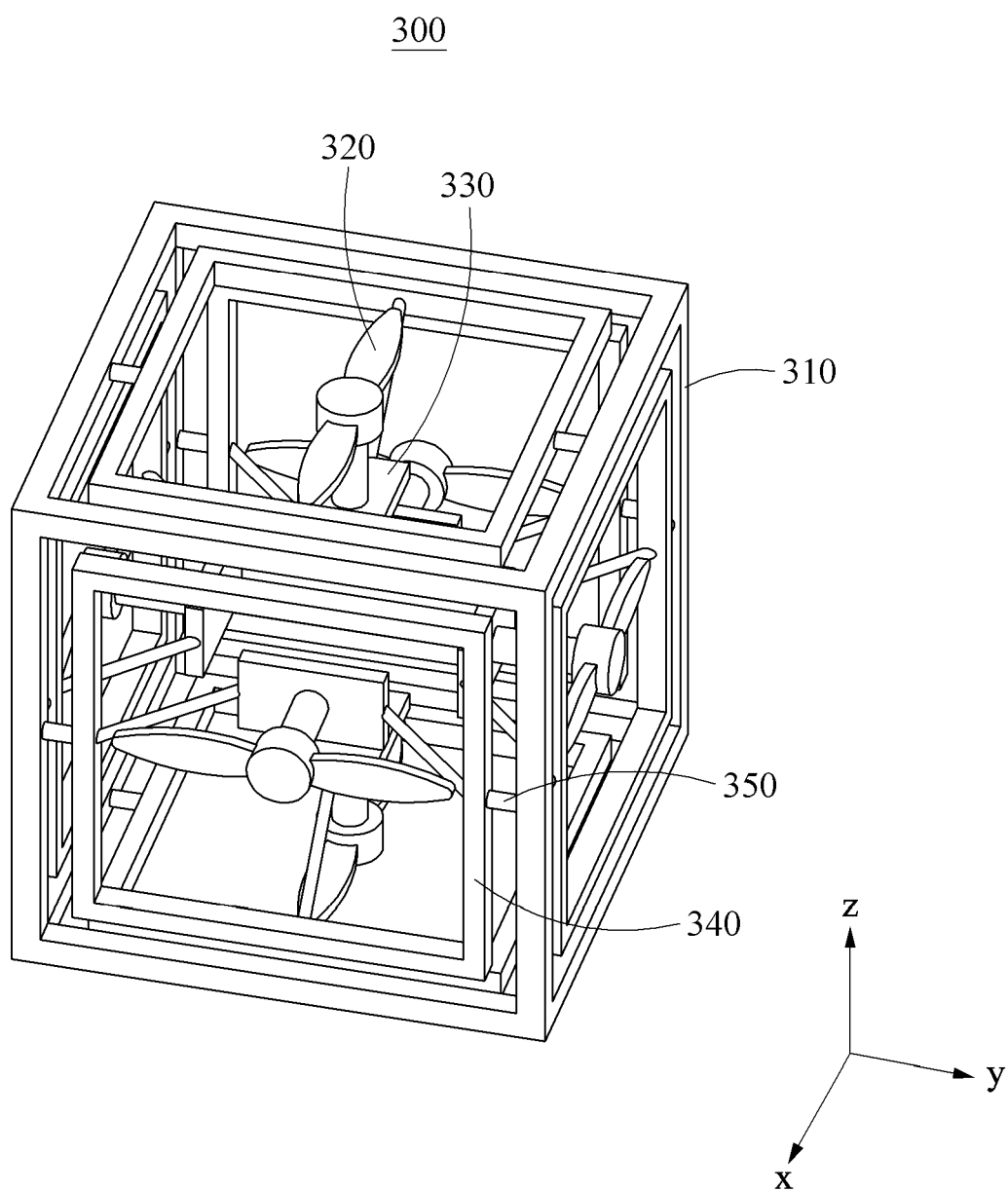
FIG. 18 is a perspective view illustrating an example of a unit module drone of a shape-reconfigurable drone including a first rotation frame and a first rotation shaft according to a third example embodiment.
Figure 19:
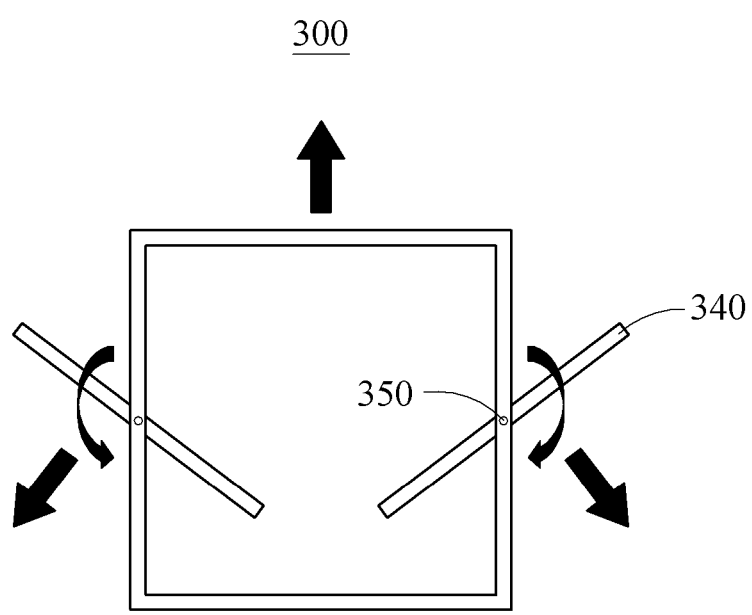
FIG. 19 is a diagram illustrating an example of a shape in which a thruster of a unit module drone of a shape-reconfigurable drone is tilted with respect to each of hexahedral faces according to the third example embodiment.
Figure 20:
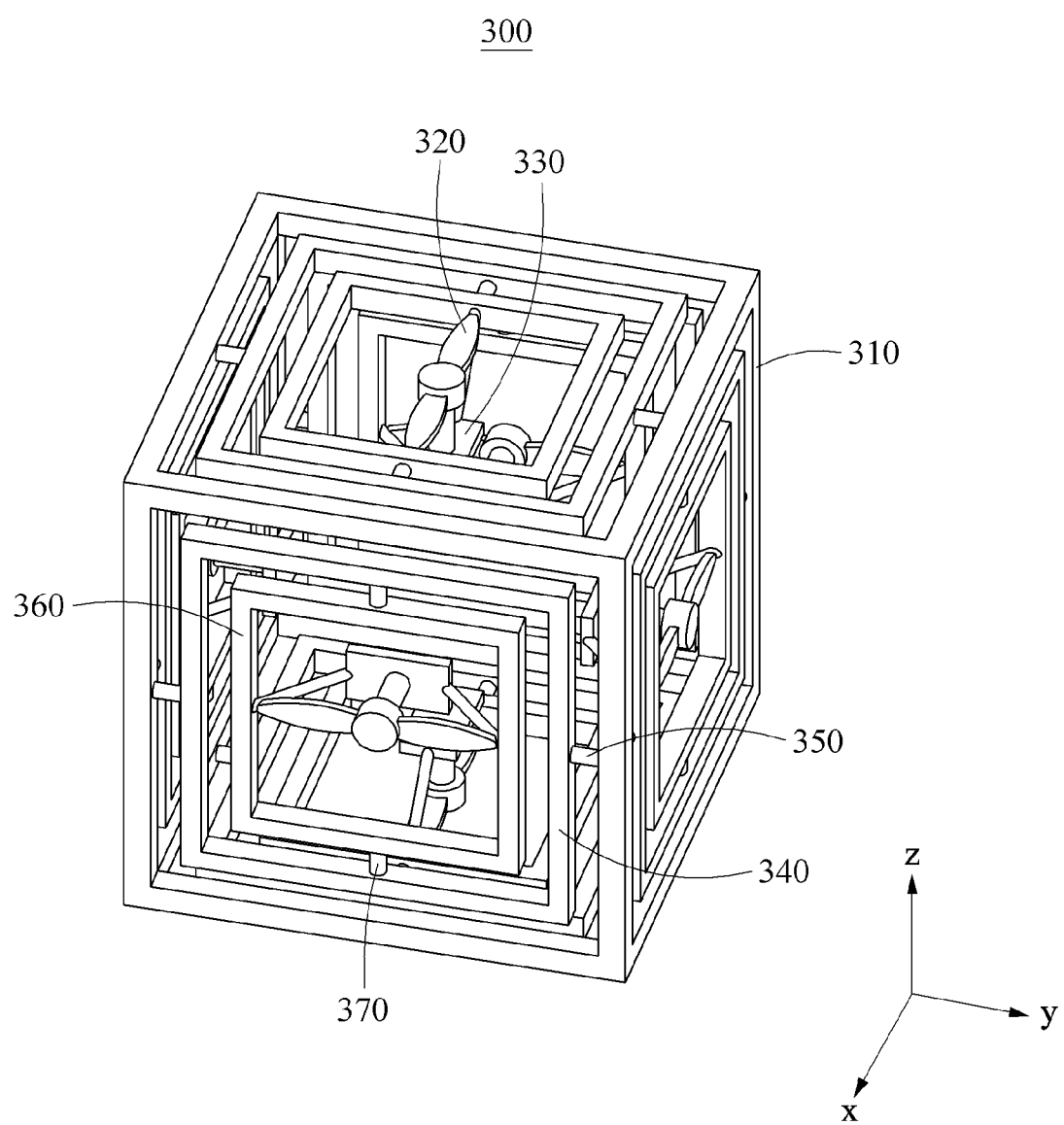
FIG. 20 is a perspective view illustrating an example of a unit module drone of a shape-reconfigurable drone including a second rotation frame and a second rotation shaft according to the third example embodiment.
Figure 21:
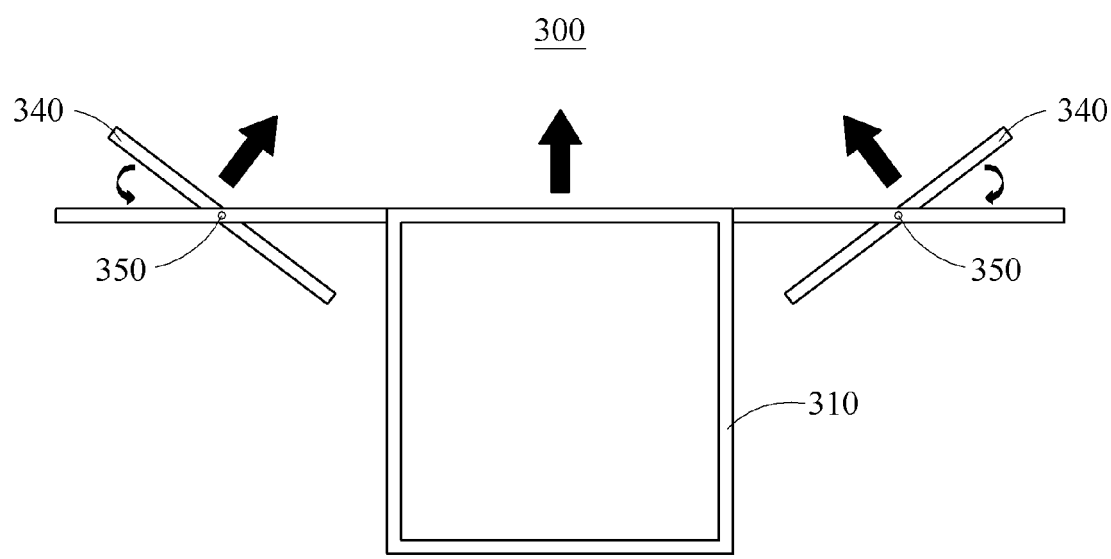
FIG. 21 is a diagram illustrating an example of a shape in which, when neighboring faces of one face among hexahedral faces of a unit module drone of a shape-reconfigurable drone are unfolded based on the one face, a thruster is tilted with respect to the unfolded faces according to the third example embodiment.
Figure 22:
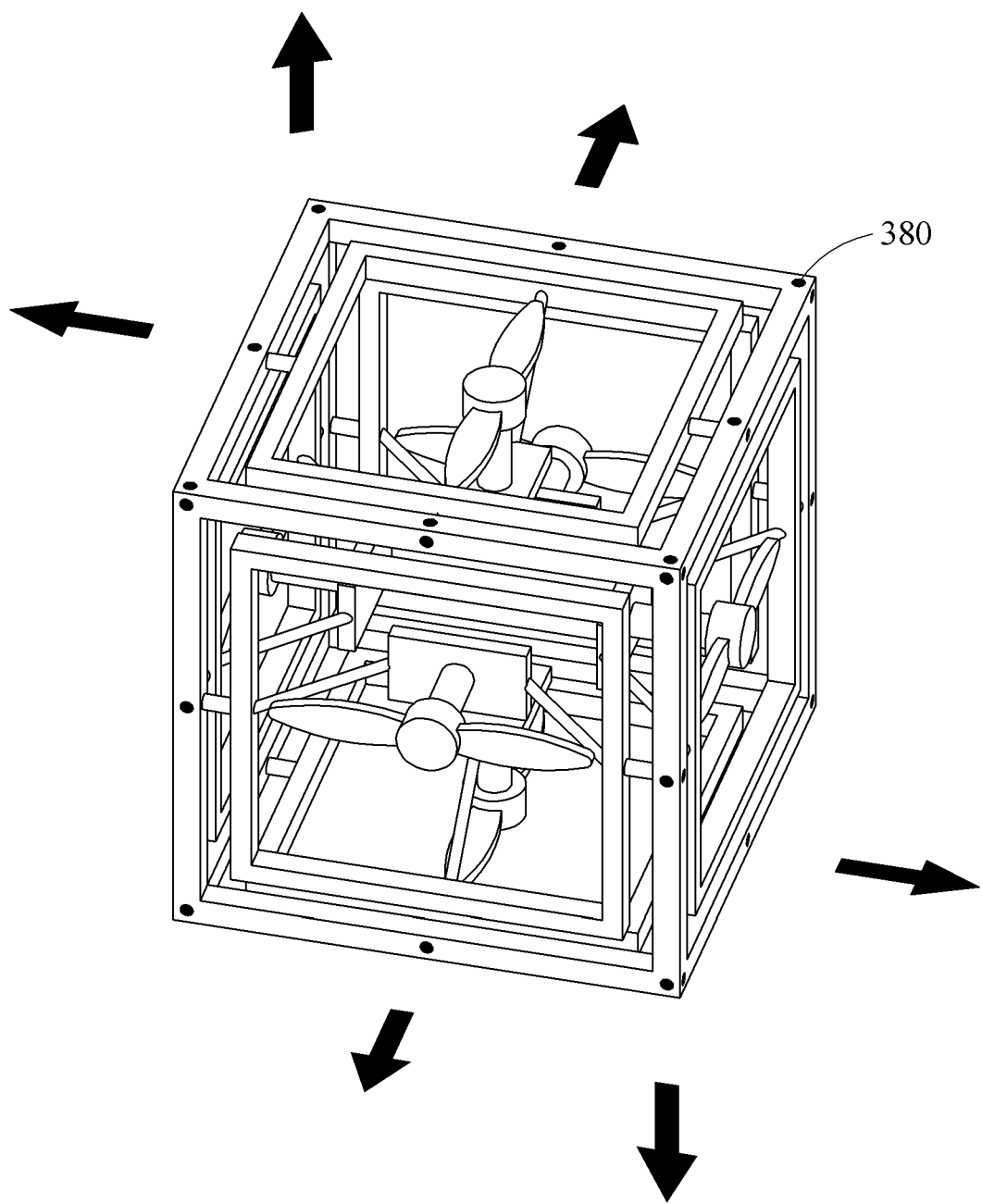
FIG. 22 is a perspective view illustrating an example of a unit module drone of a shape-reconfigurable drone including a connector according to the third example embodiment.

FIG. 18 is a perspective view illustrating a unit module drone of a shape-reconfigurable drone including a first rotation frame and a first rotation shaft according to a third example embodiment. FIG. 19 is a diagram illustrating an example of a shape in which a thruster of a unit module drone of a shape-reconfigurable drone is tilted with respect to each of hexahedral faces according to the third example embodiment. FIG. 20 is a perspective view illustrating a unit module drone of a shape-reconfigurable drone including a second rotation frame and a second rotation shaft according to the third example embodiment. FIG. 21 is a diagram illustrating an example of a shape in which, when neighboring faces of one face among hexahedral faces of a unit module drone of a shape-reconfigurable drone are unfolded based on the one face, a thruster is tilted with respect to each of the unfolded faces according to the third example embodiment. FIG. 22 is a perspective view illustrating an example of a unit module drone of a shape-reconfigurable drone including a connector according to the third example embodiment. FIG. 23 is a diagram illustrating an example of an assembly drone of which a thruster generates a thrust force in a direction in which the thruster is tilted with respect to faces.

Referring to FIG. 18, a drone according to a third example embodiment includes a unit module drone 300 including a body provided in a hexahedral shape including an outer frame 310, a thruster 320 provided on each of hexahedral faces of the body and configured to generate a thrust force in each of hexahedral directions, and a power supplier 330 connected to the thruster 320 and configured to supply power to the thruster 320, and may be configured as the unit module drone 300 of which the thruster 320 is tilted with respect to each of the hexahedral faces.

The unit module drone 300 includes the outer frame 310, the thruster 320, and the power supplier 330, and the body may be provided in the hexahedral shape including the outer frame 310.

To form an assembly drone 3000 by combining or connecting a plurality of unit module drones 300, the outer frame 310 may be provided in a shape of a regular hexahedron or a cube. However, a shape of the outer frame 310 is not limited to the example shape described in the foregoing and any shapes, for example, a triangular pyramid and an octahedron, may also be used as necessary.

The thruster 320 may be provided on each of the hexahedral faces of the body. That is, the thruster 320 may be provided as six thrusters in the hexahedral directions, upward and downward directions, left and right directions, and forward and backward directions. The thruster 320 may generate a thrust force in each of the hexahedral directions such that the unit module drone 300 may perform operations, for example, a flight, a takeoff, and a landing.

That is, the unit module drone 300 of the drone according to the third example embodiment includes the thruster 320 that may generate a thrust force in all the hexahedral directions, and thus may move horizontally in any of the hexahedral directions. Thus, a load or freight loaded in the unit module drone 300 may be prevented from being tilted in a direction in which the unit module drone 300 travels, or a center of gravity may not be tilted to one side.

In addition, such a horizontal movement may be enabled in all the hexahedral directions, and thus the unit module drone 300 may move to an accurate location of a desired destination and an accurate point at which the unit module drone 300 takes off or is landed.

The horizontal movement may enable the drone to move in a desired direction without a rotational motion such as rolling, pitching, and yawing motions, and thus it is easy to control a flight of the drone. In addition, the horizontal movement may enable a safer movement, and thus it may be possible to more safely transport food, dangerous chemical explosives, or the like.

Although it is recommended to use, for the thruster 320, a widely-used propeller type using a thrust force generated by a rotation of a propeller, a type of the thruster 320 is not limited to the illustrative example described in the foregoing and other various types, such as a jet engine type, may also be applied in addition to the propeller type.

a. In addition, the thruster 320 may be tilted with respect to each of the hexahedral faces. Each of thrusters 320 provided on the hexahedral faces may rotate on a corresponding face of the hexahedral faces, and be tilted with respect to a corresponding face of the hexahedral faces.

The thruster 320 may have rotation faces on a plurality of axes or shafts because the thruster 320 is tilted with respect to each of the hexahedral faces, and thus a thrust direction may be controlled at various angles.

Thus, a horizontal movement may be enabled in the hexahedral directions by providing, on the hexahedral faces, the thrusters 320 configured to generate thrust forces at various angles, and a rotational motion such as rolling, pitching, and yawing motions may not be generated by a movement of the unit module drone 300. Thus, a weight of load or freight may not be shifted to one side.

The power supplier 330 is connected to the thruster 320, and supplies power to the thruster 320. The power supplier 330 may rotate along with the thruster 320 when the thruster 320 is tilted with respect to the hexahedral faces while rotating.

For the thruster 320 to be tilted as described in the foregoing, the unit module drone 300 includes a first rotation frame 340. The first rotation frame 340 is provided inside the hexahedral faces of the outer frame 310, and rotates on a first rotation shaft 350 with respect to the outer frame 310.

Here, the thruster 320 is fixed to the first rotation frame 340, and rotates along with the first rotation frame 340 when the first rotation frame 340 rotates on the first rotation shaft 350 with respect to the outer frame 310.

That is, in a case in which the first rotation shaft 350 is set in a y-axis direction when observed from a front side of the unit module drone 300, the thruster 320 may be tilted with respect to a yz plane by rotating on a y axis along with the first rotation frame 340.

However, the first rotation shaft 350 is not necessarily set in the y-axis direction as illustrated in FIG. 1, and may be set in various directions. Thus, the first rotation shaft 350 may be set in a z-axis direction or a direction diagonal to the yz plane.

In a case in which the first rotation shaft 350 is set in the z-axis direction, the thruster 320 may be tilted with respect to the yz plane by rotating on the z axis along with the first rotation frame 340.

As described above, the thruster 320 provided on each of the hexahedral faces may be tilted with respect to the hexahedral faces while rotating on an x axis, a y axis, a z axis, or other axes, as necessary, along with the first rotation frame 340.

However, a structure in which the thruster 320 is tilted with respect to the hexahedral faces is not limited to the example described in the foregoing. Thus, any structure that may change a thrust direction of the thruster 320 when a drive shaft of the thruster 320 is tilted based on a center rotation point on the hexahedral faces may also be possible.

Referring to FIG. 19, the thrusters 320 provided on a left side face and a right side face among the thrusters 320 provided on the hexahedral faces may be tilted with respect to the side faces when the first rotation frame 340 rotates. Thus, the thrusters 320 may be tilted based on the first rotation shaft 350 as a center.

In such a case, when the thrusters 320 provided on the left and right side faces are tilted to be perpendicular to the left and right side faces in a same direction as a direction of the thruster 320 provided on an upper face, the three thrusters 320 may generate thrust forces in a same direction, and thus may generate a combined thrust force that is three times greater than a thrust force. In addition, a flight control algorithm used for an existing quadcopter may be used, and also a high-speed flight or operation may be enabled.

However, examples are not limited to the illustrative example, and the remaining thrusters 320 other than the thrusters 320 provided on the left and right side faces may also be tilted respectively. In a case in which the thruster 320 provided on the upper face remains to be parallel to the upper face, and the four thrusters 320 provided on side faces are tilted to form 90° with the side faces, all the five thrusters 320 may generate a combined thrust force in a same direction. Thus, a fivefold thrust force may be generated.

In addition, it is possible to tilt again the thruster 320 in an unnecessary direction during a flight of the drone, and thus it is also possible to save energy.

Referring to FIG. 20, the unit module drone 300 includes a second rotation frame 360. The second rotation frame 360 is provided inside the first rotation frame 340, and rotates on a second rotation shaft 370 with respect to the first rotation frame 340.

Here, the second rotation shaft 370 is perpendicular to the first rotation shaft 350, and the thruster 320 is fixed to the second rotation frame 360.

Thus, in such a case, the first rotation frame 340 may rotate with respect to the outer frame 310, and the second rotation frame 360 may simultaneously rotate with respect to the first rotation frame 340 in a direction perpendicular to a rotation direction of the first rotation frame 340.

Thus, the thruster 320 fixed to the second rotation frame 360 may rotate on the two shafts, and thus may rotate simultaneously in two directions with respect to the hexahedral faces.

However, examples are not limited to the example described in the foregoing, and the second rotation shaft 370 may form an arbitrary angle with the first rotation shaft 350.

In addition, a predetermined number of rotation frames and rotation shafts may also be additionally installed inside the second rotation frame 360, as necessary, and thus the thruster 320 may rotate simultaneously in multiple directions with respect to the hexahedral faces.

Referring to FIG. 21, neighboring faces of one face among the hexahedral faces may be unfolded or folded based on the one face. The neighboring faces may be unfolded and folded based on a frame forming the one face as an axis. Here, when the neighboring faces of the one face among the hexahedral faces are unfolded in a range of 90° to form a same plane with the one face, five faces of the hexahedral faces may form a same plane when the unit module drone 300 flies.

Here, side faces may be unfolded and folded without a restriction on an angle. By using a side face folder, the side faces may be unfolded at a desired fixed angle or remain to be folded. As described above, neighboring faces of one face among the hexahedral faces may be unfolded to form a same plane with the one face, and also unfolded or folded to form an oblique angle or a right angle with the one face.

Also, when the neighboring faces of the one face are unfolded in a range of 90° to form a same plane with the one face, the thruster 320 may be tilted with respect to the unfolded faces.

Thus, the thruster 320 may generate a thrust force at various angles, and thus a rotational motion such as rolling, pitching, and yawing motions may not be generated by a movement of the drone. Thus, a weight of a load or freight may not be shifted to one side. In addition, a flight control algorithm used for an existing quadcopter may be used, and also a high-speed flight or operation may be enabled.

However, examples are not limited to the example described in the foregoing, and it is possible to unfold or fold the hexahedral faces at an arbitrary angle as necessary, and also to tilt the thrusters 320 provided on the hexahedral faces towards an arbitrary direction with respect to the hexahedral faces. In addition, it is possible to fold again an unnecessary face among the hexahedral faces during a flight, and thus save energy.

To allow the first rotation frame 340 and the second rotation frame 360 to rotate, the unit module drone 300 may include a bearing, a motor, an actuator, a bevel gear, or a worm gear, but not limited thereto. Thus, any means or methods that may rotate a frame may also be used.

The unit module drone 300 further includes a controller (not shown) to control an angle at which the thruster 320 is tilted with respect to the hexahedral faces. The controller may be configured as a control device such as a computer, and provided on one side in the body.

The controller controls a flight of the drone or related algorithms. Although it is recommended to provide the controller at a center of the body, it is also possible to provide the controller on one side in the outer frame 310.

The unit module drone 300 of the drone according to the third example embodiment may be provided in a form in which the thruster 320 is tilted with respect to the hexahedral faces of the unit module drone 300, and the controller may control a thrust direction at various angles such that the thruster 320 may have a plurality of rotation faces on axes.

Referring to FIG. 22, the unit module drone 300 includes the outer frame 310, and further includes a connector 380 to connect a plurality of unit module drones 300. The connector 380 is used to connect the unit module drones 300 to form the assembly drone 3000 in a desired form or shape, and it is recommend that the connector 380 is disposed on the outer frame 310 for a tight connection or combination of the unit module drones 300.

The connector 380 may connect the unit module drones 300 through various combining or connecting methods, for example, using a magnet or a bolt. To attach the unit module drones 300 using a magnet, the connector 380 may be provided in a form of a magnet. Also, to connect the unit module drones 300 suing the bolt, the connector 380 may be provided in a form of a hollow portion for a bolt and nut coupling or in a form of a pre-provided bolt. However, types or forms of the connector 380 are not limited to the examples described in the foregoing.

A drone according to a fourth example embodiment includes a unit module drone including a body including a polyhedral frame, a connector provided on the frame and configured to connect bodies of unit module drones, and a thruster provided on each of faces of the body and configured to generate a thrust force in a direction in which the thruster is tilted with respect to the faces. The drone may also be configured as the assembly drone 3000 formed by combining or connecting a plurality of unit module drones by the connector.

Referring to FIG. 23, the unit module drone 300 may be a hexahedral-shaped drone. The unit module drone 300 further includes the connector 380 provided on an outer side face of the body to connect the bodies of the unit module drones 300. The connector 380 may connect the bodies of the unit module drones 300 to form the assembly drone 3000.

The thrusters 320 provided on remaining faces, excluding connected faces of the assembly drone 3000, may be tilted with respect to the remaining faces and generate a thrust force in a direction.

In a case of the assembly drone 3000 formed with two unit module drones 300 being combined or connected, the thrusters 320 provided on side faces may be tilted with respect to the side faces to form a same direction as a direction of the thrusters 320 provided on upper faces, the eight thrusters 320 may generate a combined thrust force in a same direction, and thus a fourfold thrust force may be generated. Thus, a more stable posture control may be enabled, and a flight with a relatively heavier load or freight may also be enabled.

However, examples are not limited to the example described in the foregoing, and a greater number of unit module drones 300 may be connected as necessary. In addition, a greater number of thrusters 320 may be tilted with respect to corresponding faces to generate a combined thrust force in a same direction, and thus a stronger thrust force may be generated in the same direction.

Although the unit module drone 300 provided in a hexahedral shape is described above, it is obvious that a unit module drone may be provided in various polyhedral shapes, for example, a triangular pyramid and an octahedron, as necessary.

In a case in which a single unit module drone is not sufficient to perform a certain operation or the drone needs to be used for other purposes, a plurality of unit module drones may be combined or connected to form an assembly drone, for example, the assembly drone 3000, to be used based on a purpose of use and a place or a location.

In addition, the assembly drone 3000 may transport freight connected to a freight connector (not shown). The freight connector may be provided in various types, for example, a latch or a lifter. However, a type of the freight connector is not limited to the example types described in the foregoing, and any types that may be fixed to freight and transport the freight may also be used for the freight connector.

For example, in a case in which a single unit module drone 300 has a thrust force that may transport a weight of 1 kg, the drone may be reconfigured as the assembly drone 3000 by combining or connecting n unit module drones 300, and thus it is possible to transport a weight of 1 kg×n. Therefore, the drone may transport freight by combining or connecting unit module drones based on a weight of freight to be transported.

Although a few example embodiments, for example, the first, the second, the third, and the fourth example embodiments, have been shown and described herein with reference to the accompanying drawings, the present disclosure is not limited to the described first, second, third, and fourth example embodiments. Instead, it would be appreciated by those skilled in the art that changes may be made to these example embodiments without departing from the principles and spirit of the disclosure, the scope of which is defined by the claims and their equivalents.

The invention claimed is:

1. A shape-reconfigurable drone, comprising:
   a unit module drone, comprising:
      a body including a frame and provided in a rectangular parallelepiped shape;
      a controller provided centrally within the body and configured to control a flight;
      a plurality of thrusters connected to the controller and provided on each hexahedral face of the rectangular parallelepiped shape, and configured to generate a thrust force in each hexahedral direction;
      a power supplier provided on one side of the controller and configured to supply power to the plurality of thrusters under control of the controller; and
      a connector provided on an outer face of the body to connect bodies of unit module drones,
      wherein the shape-reconfigurable drone is configured as an assembly drone provided in a form in which the unit module drones are connected by the connector.

2. The shape-reconfigurable drone of claim 1, wherein the unit module drone comprises a direction axis setter configured to set a direction axis using a ground contact sensor provided on one side of the body.

3. The shape-reconfigurable drone of claim 1, wherein the unit module drone comprises a body direction setter configured to set a positional direction of the body using an inertia sensor provided on another side of the body.

4. The shape-reconfigurable drone of claim 1, wherein the plurality of thrusters is provided as propeller type thrusters.

5. The shape-reconfigurable drone of claim 4, wherein the plurality of thrusters is provided as a pair of coaxial propellers having opposite propeller pitches.

6. The shape-reconfigurable drone of claim 4, wherein the plurality of thrusters is provided as contra-rotating propellers.

7. The shape-reconfigurable drone of claim 4, wherein each of the plurality of thrusters includes a thrust vector control device.

8. The shape-reconfigurable drone of claim 1, wherein the body is provided in a form of a duct.

9. A shape-reconfigurable drone, comprising:
   a unit module drone, comprising:
      a body including a frame and provided in a hexahedral shape;
      a thruster provided on each hexahedral face of the body and configured to generate a thrust force in each hexahedral direction; and
      a power supplier extended from the frame and fixed, and configured to supply power to the thruster,
      wherein neighboring faces of one face among the hexahedral faces are unfolded or folded based on the one face, and
      wherein the neighboring faces of the one face among the hexahedral faces are unfolded to form a same plane with the one face.

10. The shape-reconfigurable drone of claim 9, wherein the unit module drone further comprises an actuator configured to allow the neighboring faces of the one face among the hexahedral faces to be unfolded or folded based on the one face.

11. The shape-reconfigurable drone of claim 9, wherein the unit module drone further comprises a connector provided on an outer face of the body and configured to connect bodies of unit module drones.

12. The shape-reconfigurable drone of claim 11, wherein neighboring faces of one face among remaining faces excluding connected faces of an assembly drone formed by connecting the bodies by the connector are unfolded or folded based on the one face.

13. A shape-reconfigurable drone, comprising:
a unit module drone, comprising:
a body including an outer frame and provided in a hexahedral shape;
a thruster provided on each hexahedral face of the body and configured to generate a thrust force in each hexahedral direction; and
a power supplier connected to the thruster and configured to supply power to the thruster,
wherein the thruster is tilted with respect to each of the hexahedral faces, and
wherein a drive shaft of the thruster is tilted based on a center rotation point on each of the hexahedral faces to change a thrust direction.

14. The shape-reconfigurable drone of claim 13, wherein the unit module drone further comprises a first rotation frame provided on an inner side of the hexahedral faces of the outer frame, and configured to rotate on a first rotation shaft with respect to the outer frame, wherein the thruster is fixed to the first rotation frame.

15. The shape-reconfigurable drone of claim 14, wherein the unit module drone further comprises a second rotation frame provided on an inner side of the first rotation frame, and configured to rotate on a second rotation shaft with respect to the first rotation frame,
wherein the second rotation shaft is perpendicular to the first rotation shaft, and the thruster is fixed to the second rotation frame.

16. The shape-reconfigurable drone of claim 15, wherein the unit module drone further comprises a bearing, a motor, an actuator, a bevel gear, or a worm gear to allow the first rotation frame and the second rotation frame to rotate.

17. The shape-reconfigurable drone of claim 13, wherein the unit module drone further comprises a controller configured to control an angle at which the thruster is tilted with respect to each of the hexahedral faces.

18. The shape-reconfigurable drone of claim 13, wherein the unit module drone further comprises a connector provided on the outer frame, and configured to connect a plurality of unit module drones.

* * * * *